US008033099B2

(12) United States Patent
Ohshima et al.

(10) Patent No.: US 8,033,099 B2
(45) Date of Patent: Oct. 11, 2011

(54) EXHAUST GAS PURIFYING SYSTEM

(75) Inventors: Keiji Ohshima, Gamagoori (JP); Ataru Ichikawa, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 972 days.

(21) Appl. No.: 11/953,960

(22) Filed: Dec. 11, 2007

(65) Prior Publication Data

US 2008/0148717 A1 Jun. 26, 2008

(30) Foreign Application Priority Data

Dec. 20, 2006 (JP) ................................ 2006-342318

(51) Int. Cl.
*F01N 3/00* (2006.01)

(52) U.S. Cl. ................ 60/286; 60/274; 60/295; 60/301; 239/533.12; 239/596

(58) Field of Classification Search ............ 60/273–301; 239/533.12, 596; 251/129.21
See application file for complete search history.

(56) References Cited

U.S. PATENT DOCUMENTS

| | | | | |
|---|---|---|---|---|
| 4,955,183 | A * | 9/1990 | Kolodzie et al. | 60/303 |
| 6,382,600 | B1 * | 5/2002 | Mahr | 261/78.2 |
| 6,401,449 | B1 | 6/2002 | Hofmann et al. | |
| 6,539,708 | B1 * | 4/2003 | Hofmann et al. | 60/286 |
| 6,553,755 | B2 | 4/2003 | Hofmann et al. | |
| 6,802,296 | B2 * | 10/2004 | Arndt et al. | 123/299 |
| 7,882,697 | B2 * | 2/2011 | Ichikawa | 60/286 |
| 2005/0120995 | A1 * | 6/2005 | Tsujimoto et al. | 123/299 |
| 2006/0191511 | A1 * | 8/2006 | Mifuji et al. | 123/305 |
| 2007/0035832 | A1 * | 2/2007 | Hirata et al. | 359/484 |
| 2007/0193255 | A1 * | 8/2007 | Satou | 60/286 |

FOREIGN PATENT DOCUMENTS

| | | |
|---|---|---|
| JP | 2001-516635 | 10/2001 |
| JP | 2002-503783 | 2/2002 |
| JP | 2003-293739 | 10/2003 |

* cited by examiner

*Primary Examiner* — Thomas Denion
*Assistant Examiner* — Jesse Bogue
(74) *Attorney, Agent, or Firm* — Nixon & Vanderhye PC

(57) ABSTRACT

An additive agent injection valve and a catalyst unit are formed on an exhaust gas tube in an exhaust gas purifying system. The additive agent injection valve injects urea solution into exhaust gas flowing through the exhaust gas passage. The additive agent injection valve has a first spray part having a first traveling distance and a second spray part having a second traveling distance which is longer than the first traveling distance.

15 Claims, 15 Drawing Sheets

EXHAUST GAS PURIFYING SYSTEM

CROSS-REFERENCE TO RELATED APPLICATION

This application is related to and claims priority from Japanese Patent Application No. 2006-342318 filed on Dec. 20, 2006, the content of which is hereby incorporated by reference.

BACKGROUND OF THE INVENTION

1. Field of the Invention

The present invention relates to an exhaust gas purifying system such as a urea SCR (selective catalyst reduction) system as a typical example, capable of purifying exhaust gas emitted from an internal combustion engine, for example, mounted on motor vehicles, by carrying out exhaust purifying reaction on catalysts using a predetermined additive agent. More particularly, the present invention relates to an exhaust gas purifying system capable of purifying exhaust gas by exhaust gas purifying reaction as well as promoting the exhaust gas purifying reaction with an additive agent such as a urea solution to be injected into the exhaust gas flow by an additive agent injection valve.

2. Description of the Related Art

Recently, urea SCR (selective catalyst reduction) system as an exhaust gas purifying system has been studied and developed, which is applicable to thermal power plants, various types of factories, and auto vehicles (in particular, a motor vehicle equipped with a diesel engine). The urea SCR system is capable of purifying particulate matter (PM) such as NOx (Nitrogen oxide) contained in the exhaust gas. Some of those researches have been put into practical use.

There is a conventional well-known urea SCR system disclosed in Japanese paten laid open publication No. JP 2003-293739.

A description will now be given of a typical configuration, with reference to FIG. 14, adopted to conventional usual urea SCR systems as well as to the system of Japanese patent laid open publication No. JP 2003-293739.

As shown in FIG. 14, the conventional urea SCR system is composed mainly of a catalyst unit 51, an exhaust tube 52, and an additive agent injection valve 53 placed in the middle of the exhaust tube 52. The catalyst unit 51 promotes the exhaust gas purifying reaction. Through the exhaust gas tube 52 the exhaust gas emitted from an exhaust gas generation source (for example, an engine) flows and is introduced into the catalyst unit 51. The additive agent injection valve 53 injects urea solution (as additive agent) to the exhaust gas flowing in the exhaust tube 52. The catalyst 51 is capable of promoting reduction reaction for NOx contained in the exhaust gas.

In the conventional urea SCR system having the above configuration shown in FIG. 14, the additive agent injection valve 53 injects the urea solution into the flow of the exhaust gas in the exhaust tube 52, the flow of the exhaust gas (or the exhaust gas flow) supplies the injected urea solution to the catalyst unit 51 which houses catalyst at the downstream side when observed from the position of the additive injection valve 53.

In the catalyst unit 51, the reduction reaction of NOx contained in the exhaust gas is performed with catalyst. This reduction reaction can purify NOx contained in the exhaust gas. In the reduction reaction, urea solution is hydrolyzed with thermal energy of the exhaust gas to generate ammonia ($NH_3$). NOx contained in the exhaust gas is reduced and purified with the catalyst in the catalyst unit 51. Japanese patent kohyo (Japan unexamined patent publication as a national publication of translated version) No. JP 2001-516635 disclosed such an additive agent injection valve 53 shown in FIG, 14 which is mounted on the exhaust gas tube 52, more particularly, disclosed the additive agent injection valve mounted on a passage wall of the exhaust gas tube 52. Like the configuration shown in FIG. 14, the Japanese patent kohyo No. JP 2001-516635 disclosed the urea addition valve placed in an exhaust gas tube so that an outlet opening of the urea addition valve leans to an exhaust gas tube toward a catalyst unit which houses catalyst. However, it is generally desirable to spray ammonium gas generated by hydrolysis of urea solution onto the entire end surface of the catalyst unit 51 at the upstream side of the exhaust gas flow in order to adequately purify the exhaust gas in the catalyst unit 51. This configuration enables that NOx contained in the exhaust gas is completely reduced in the entire area of the catalyst unit 51. Accordingly, there is a demand to spray the additive agent (urea solution) into the entire section area of the exhaust gas tube by the additive agent injection valve in order to distribute ammonium gas into the entire end surface side of the catalyst unit 51 at the upstream side thereof. In particular, in a case of mounting the additive agent injection valve 53 on the exhaust gas tube 52 as an exhaust gas passage of a straight pile shape, as shown in FIG. 15, most of spray immediately following the injection by the additive agent injection valve 53 is carried away with the flow of the exhaust gas emitted from an internal combustion engine, as a result, there is a possibility that the spray does not reach the opposite part 60 in position to the area at which the additive agent injection valve 53 is mounted on the exhaust gas tube 52. This causes that ammonium gas generated by hydrolysis of urea solution reaches only a part of the upstream side end surface of the catalyst unit 51. This means that the catalyst does not serve as catalyst in a part of the catalyst unit at the upstream side thereof to which no ammonium gas is carried and where NOx is not reduced and purified. Thus, there is a possibility to adequately exhibit the purifying performance of the catalyst at the part to which no ammonium gas is carried.

By the way, Japanese patent laid open publication No. JP 2001-516635 disclosed a net (designated by reference number 56 shown in FIG. 3 of JP 2001-516635) placed at an outlet opening of an additive agent injection valve in order to uniformly spray urea solution into an exhaust gas tube, and further disclosed a deflector (designated by reference number 28 shown in FIG. 2 of JP 2001-516635) in order to change the direction of the urea solution injected from the additive agent injection valve.

However, spray of urea solution injected from the additive agent injection valve, as shown in the conventional system disclosed in JP 2001-516635, is also considerably influenced by the exhaust gas flow. This case also introduces a possibility of not reaching the spray of the urea solution to the opposite area to the additive agent injection valve mounted on the exhaust tube.

SUMMARY

It is an object of the present exemplary embodiment to provide an improved exhaust gas purifying system in which a spray of an additive agent such as a urea solution injected from an additive agent injection valve, which is mounted on a passage wall (or an “upper-side wall” or a “side wall” for short) of an exhaust gas tube, can adequately reach an opposite area in position to the area at which the additive agent injection valve is placed in the passage wall of the exhaust gas tube.

To achieve the above purposes, the present exemplary embodiment provides an exhaust gas purifying system having an additive agent injection valve and a catalyst injection valve. The additive agent injection valve is mounted on a passage wall (or a side wall) of an exhaust gas passage through which exhaust gas as a target in purification passes. The additive agent injection valve is capable of injecting an additive agent into the exhaust gas passage. The catalyst unit is placed at a downstream side observed from the additive agent injection valve in the exhaust gas passage. The catalyst unit accommodates a catalyst therein. The catalyst is capable of promoting an exhaust gas purifying reaction based on at least the additive agent which is supplied, namely, transported from the additive agent injection valve to the catalyst unit through the exhaust gas flow. The additive agent injection valve has a first spray injection part and a second spray injection part. The first injection part injects a first spray of the additive agent having a first traveling distance in the exhaust gas passage. The second spray injection part injects a second spray of the additive agent in the exhaust gas passage. The second spray has a second traveling distance which is greater than the first traveling distance.

According to the configuration of the exhaust gas purifying system, the second spray injection part provides the second spray of a traveling distance, which is larger than that of the first spray, in the exhaust gas 10 passage. That is, the second spray injection part supplies the spray of a large penetration force so that the traveling distance of the second spray is larger than that of the first spray. It is thereby possible to more certainly provide the additive agent to the opposite area in position to the mounting area of the additive agent injection valve in the exhaust gas passage even if the exhaust gas flows through the exhaust gas passage. Accordingly, because the additive agent, which reaches the opposite area to the additive agent injection valve, finally reaches the end surface of the catalyst unit placed at the downstream side of the exhaust gas passage with the exhaust gas flow, the catalyst in the catalyst unit can improve its purifying capability.

In the exhaust gas purifying system as another aspect of the present invention, the second spray injection part is placed at the upstream side of the exhaust gas flowing through the exhaust gas passage when compared with the position of the first spray injection part, and the first spray injection part and the second spray injection part inject the first spray of the additive agent and the second spray of the additive agent, respectively, into a same direction.

Because the second spray injection part is placed at the upstream side of the exhaust gas flow when compared with the position of the first spray injection part, it is possible to ensure the distance from the position of the additive agent injection valve to the catalyst unit in order that the second spray can reach the opposite area to the position of the additive agent injection valve by overcoming the flow of the exhaust gas even if the first spray injection part and the second spray injection part inject the spray of urea solution into a same direction. This can ensure the supply of the second spray to a desired area in the exhaust gas passage and to the end surface of the catalyst unit at the upstream side thereof in the exhaust gas flow.

In the exhaust gas purifying system as another aspect of the present invention, the second spray injection part is placed at the upstream side of the exhaust gas which flows through the exhaust gas passage when compared with the position of the first spray injection part, and the second spray injection part injects the second spray of the additive agent toward the upstream side of the exhaust gas flow when compared with the direction of the first spray of the additive agent injected by the first spray injection part.

This configuration further enables the second spray to overcome the exhaust gas flow and to reach the opposite area in the exhaust gas passage and to ensure the distance from the position of the additive agent injection valve to the catalyst unit in order that the second spray can reach the opposite area to the position of the additive agent injection valve. This can further ensure the supply of the second spray to a desired area in the exhaust gas passage and to the end surface of the catalyst unit at the upstream side of the catalyst unit in the exhaust gas flow.

In order to further ensure the supply of the second spray to the opposite area in position to the additive agent injection valve in the exhaust gas passage, the second spray of the additive agent injected by the second spray injection part in the exhaust gas purifying system as another aspect of the present invention is supplied into the upstream side of the exhaust gas flow observed from the vertical direction of the exhaust gas flow. According to this configuration, the second spray can be once injected toward the upstream side of the additive agent injection valve in the exhaust gas passage. It is possible to ensure the distance from the position of the additive agent injection valve to the catalyst unit in order that the second spray can reach the opposite area to the position of the additive agent injection valve by overcoming the main flow of the exhaust gas. This can ensure the supply of the second spray to a desired area in the exhaust gas passage and to the end surface of the catalyst unit at the upstream side of the catalyst unit in the exhaust gas flow.

In order to enlarge the spray traveling distance (namely, the penetration force of the second spray in the exhaust gas flow) of the second spray when compared with the spray traveling distance of the first spray in the exhaust gas passage, the additive agent injection valve in the exhaust gas purifying system as actual example, also as another aspect of the present invention, has an outlet opening part through which the additive agent is injected into the exhaust gas passage. The additive agent injection valve has the first spray injection part and the second spray injection part. The first spray injection part is composed of the plurality of first injection holes through which the first spray of the additive agent is supplied. The second spray injection part is composed of the plurality of second injection holes through which the second spray of the additive agent is supplied, wherein the diameter of each second injection hole is greater than that of the first injection hole. It is possible to have a different traveling distance of the first spray and the second spray in the exhaust gas passage by using the first injection holes and the second injection holes, whose diameter is larger than that of the first injection hole, placed at the outlet opening part of the additive agent injection valve.

In order to enlarge the spray traveling distance (namely, the penetration force of the second spray in the exhaust gas flow) of the second spray when compared with the spray traveling distance of the first spray in the exhaust gas passage, the additive agent injection valve in the exhaust gas purifying system as actual example, also as another aspect of the present invention, has a plate member in which the outlet opening part is formed. In the outlet opening part, the first injection holes and the second injection holes are formed.

That is, the plate member having the first injection holes and the second injection holes is placed at the outlet opening part of the additive agent injection valve. Because this configuration can easily adjust the size of the first and second injection holes in the plate member, it is possible to easily control the traveling distance of the first spray and the second spray.

In order to have a same injection direction of the first spray and the second spray as another aspect of the present invention, the first injection holes and the second injection holes are formed in vertical to the horizontal surface of the plate member. Thus, the formation of the first and second injection holes in the plate member can easily generate the first spray and the second spray of a same injection direction. It is thereby possible to easily mount the additive agent injection valve on the exhaust gas passage.

As a concrete example of the first spray and the second spray having a different injection direction in the exhaust gas passage, the first injection holes and the second injection holes in the exhaust gas purifying system as another aspect of the present invention are so formed in the plate member that each of the first and second injection holes has a different direction. This configuration enables the first spray and the second spray to have a desired injection angle to the flow of the exhaust gas, namely to have a different injection angle, in the exhaust gas passage.

In the exhaust gas purifying system as another aspect of the present invention, the additive agent injection valve is so formed that the axis direction of the additive agent injection valve is vertical to the flow of the exhaust gas in the exhaust gas passage. This configuration provides easy work of assembling the additive agent injection valve into the exhaust gas passage of the exhaust gas purifying system.

In the exhaust gas purifying system as another aspect of the present invention, the additive agent injection valve is so formed that the axis direction of the additive agent injection valve is tilted toward the downstream side of the exhaust gas flow when compared with the vertical direction of the exhaust gas flow. Still further, in the exhaust gas purifying system as another aspect of the present invention, the additive agent injection valve is so formed that the axis direction of the additive agent injection valve is tilted toward the upstream side of the exhaust gas flow observed from the direction which is vertical to the exhaust gas flow.

The additive agent injection valve is mounted on the exhaust gas passage while considering the injection direction of each of the first spray and the second spray as well as the spray traveling distance to the catalyst unit which houses catalyst.

In the exhaust gas purifying system as another aspect of the present invention, the additive agent injection valve has an outlet opening part through which the additive agent is injected into the flow of the exhaust gas in the exhaust gas passage, and a plurality of first injection holes and a plurality of second injection holes formed in the outlet opening part. The diameter of each second injection hole is greater than that of the first injection hole. This configuration can supply the first spray and the second spray having a different traveling distance in the exhaust gas passage because the first injection holes and the second injection holes of a different diameter are formed in the outlet opening part of the additive agent injection valve. That is, the second injection holes having a larger penetration force can inject the spray of urea solution in the exhaust gas passage so that the traveling distance of the second spray is greater than that of the first spray. It is possible to ensure the supply of the second spray injected through the second injection holes to the opposite area to the position of the additive agent injection valve while overcoming the main flow of the exhaust gas. The additive agent carried to the opposite area in the exhaust gas passage can be certainly supplied to the catalyst in the catalyst unit placed at the downstream side of the exhaust gas flow, and the additive agent carried to the catalyst unit can promote the purifying function of the catalyst.

In the exhaust gas purifying system as another aspect of the present invention, a plate member is placed at the outlet opening part, and the first injection holes and the second injection holes are formed in the plate member. Because this configuration provides easy work to adjust the diameter of each injection hole and the control of the amount of spray of the urea solution, it is possible to easily apply the additive agent injection valve to various types of internal combustion engines having a different exhaust gas flow.

In the exhaust gas purifying system as another aspect of the present invention, the first injection holes provide a first spray of the additive agent having a predetermined traveling distance, and the second injection holes provide a second spray of the additive agent having a traveling distance which is greater than the predetermined traveling distance of the first spray. The second injection holes are placed at the upstream side of the exhaust gas in the exhaust gas passage when compared in position with the first injection holes. This configuration ensures the traveling distance of the second spray from the additive agent injection valve to the catalyst unit which houses catalyst in order that the second spray can reach the opposite area of the position of the exhaust gas passage (specifically, of the exhaust gas tube) on which the additive agent injection valve is mounted. It is therefore possible to supply the second spray to a desired area in the exhaust gas passage in the exhaust gas passage and to a desired area such as the end surface of the catalyst unit at the upstream side of the catalyst unit in the exhaust gas passage.

In accordance with another aspect of the present invention, the exhaust gas purifying system has additive agent injection means and a catalyst unit. The additive agent injection means is mounted on a passage wall (or a side wall) of an exhaust gas passage through which exhaust gas as a target in purification passes. The additive agent injection means is capable of injecting an additive agent into the exhaust gas passage. The catalyst unit has catalyst therein, placed at the downstream side of the additive agent injection means in the exhaust gas passage. The catalyst unit is capable of promoting an exhaust gas purifying reaction based on at least the additive agent supplied from the additive agent injection means with the exhaust gas flow. The additive agent injection means has a first additive agent injection valve and a second additive agent injection valve. The first additive agent injection valve is mounted on the passage wall of the exhaust gas passage and injects a first spray of the additive agent having a predetermined traveling distance into the exhaust gas passage. The second additive agent injection valve is mounted on the passage wall of the exhaust gas passage and independently mounted from the first additive agent injection valve. The second additive agent injection valve injects a second spray of the additive agent having a traveling distance, which is greater than the predetermined traveling distance, into the exhaust gas passage. This configuration has two valves, the first and second additive agent injection valves, which are independently mounted on the exhaust gas passage. This configuration has the same effect of another aspect of the present invention described above. In addition, because the different additive agent injection valves can be mounted on the passage wall of the exhaust gas passage, it is possible to provide a large flexibility in injection angle of each spray and mounting position of the first and second injection valves.

In the exhaust gas purifying system as another aspect of the present invention, the second additive agent injection valve is placed at the upstream side of the exhaust gas flow on the passage wall of the exhaust gas passage when compared with the position of the first additive agent injection valve.

This configuration ensures the traveling distance of the second spray from the second additive agent injection valve to the catalyst unit which houses catalyst in order that the second spray can reach the opposite area of the exhaust gas tube on which the first and second additive agent injection valves are mounted. It is therefore possible to supply the second spray to a desired area in the exhaust gas passage in the exhaust gas tube and to a desired area such as the end surface of the catalyst unit at the upstream side of the catalyst unit in the exhaust gas passage.

In the exhaust gas purifying system as another aspect of the present invention, the additive agent is urea solution, and the catalyst in the catalyst unit is capable of promoting NOx (Nitride Oxide) reduction reaction which reduces NOx contained in the exhaust gas using ammonium which is generated by hydrolysis of the urea solution.

The urea SCR (selective catalyst reduction) system described above which is a typical NOx purifying system using urea solution as the additive agent has been anticipated as an exhaust gas purifying system capable of purifying NOx which is contained in exhaust gas. The exhaust gas purifying system according to the present invention can be applied to such a urea SCR system. On applying the exhaust gas purifying system according to the present invention to such a urea SCR system, it is possible that the additive agent reaches the opposite area to the additive agent injection valve in the exhaust gas passage. This adequately promotes the purifying function of the catalyst and can provide the exhaust gas purifying system with high purifying capability. Further, the adaptation of the exhaust gas purifying system according to the present invention to the motor vehicle field and mounting it on diesel vehicles enable that the generation of NOx during internal combustion process is permitted and the fuel consumption can be reduced and the amount of PM contained in exhaust gas can be reduced. Thus, the use of the exhaust gas purifying system according to the present invention can increase the performance of motor vehicles and contribute much to the exhaust gas cleaning.

In the exhaust gas purifying system according to the present exemplary embodiment, it is possible that each of the first and second injection holes forming the additive agent injection valve is composed of either a set of plural injection holes or a single injection hole. When a group of plural injection holes injects the spray of urea solution in a same direction (in cases of having a high concentration of spray in a same direction, as well as a case of having an enlarged distribution of spray), those plural injection holes injecting the spray in a same direction can be treated as a single injection hole.

BRIEF DESCRIPTION OF THE DRAWINGS

A preferred, non-limiting embodiment of the present invention will be described by way, of example with reference to the accompanying drawings, in which.

DETAILED DESCRIPTION OF THE PREFERRED EMBODIMENTS

Figure 1:
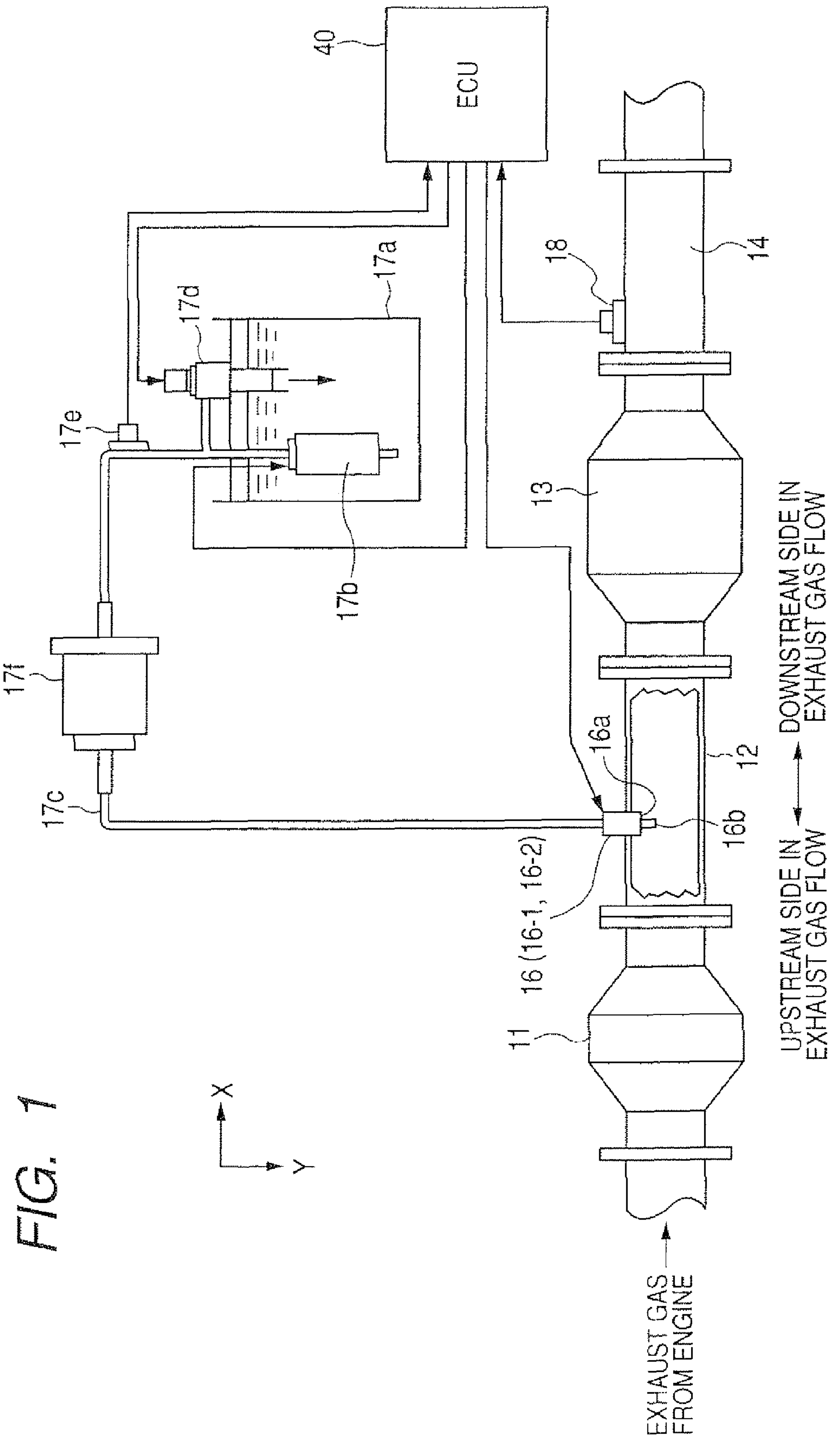
FIG. 1 is a schematic view showing a configuration of an exhaust gas purifying system according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of an exhaust gas purifying system according to a preferred embodiment of the present invention with reference to FIG. 1 to FIG. 12 and FIG. 13A to FIG. 13E.

Figure 14:
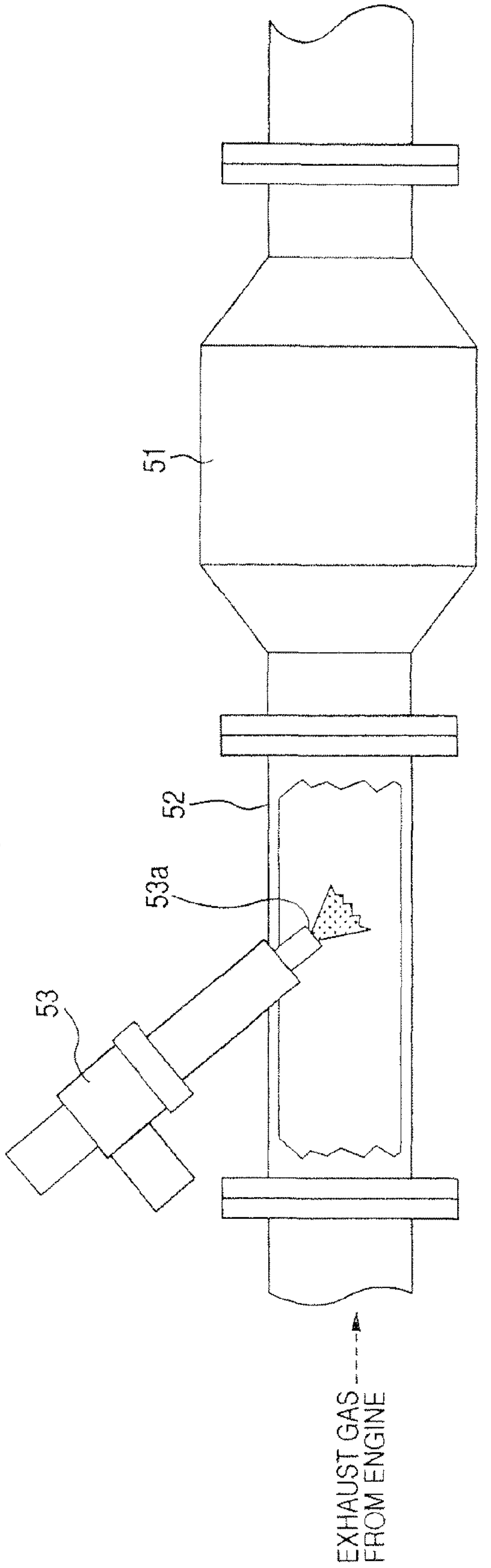
FIG. 14 is a schematic view showing a configuration of a conventional exhaust gas purifying system.
Figure 15:
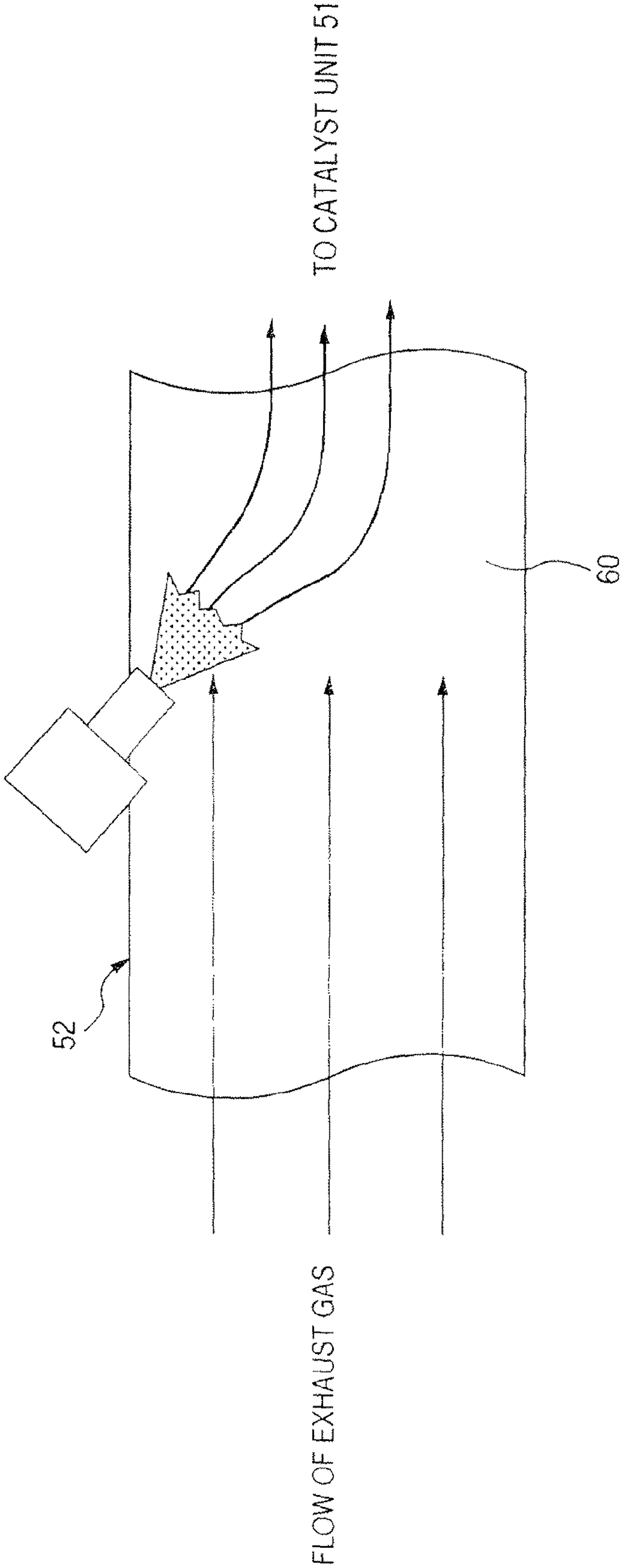
FIG. 15 is a schematic view showing a manner of purifying exhaust gas in the conventional exhaust gas purifying system shown in FIG. 14.

Like the exhaust gas purifying system as a related art shown in FIG. 14, the exhaust gas purifying system according to the embodiment is a urea SCR (selective catalyst reduction) system capable of purifying particulate matter (PM), in particular, NOx (Nitrogen oxide), contained in exhaust gas emitted from an internal combustion engine such as a diesel engine.

The configuration of the exhaust gas purifying system according to the first embodiment will now be explained with reference to FIG. 1.

FIG. 1 is a schematic view showing a configuration of a urea SCR system as the exhaust gas purifying system according to the embodiment of the present invention. In FIG, 1 arrow X indicates a horizontal line (as X direction) and Arrow Y denotes the direction of gravity (as Y direction).

As shown in FIG. 1, the exhaust gas purifying system is composed mainly of various types of actuators and sensors and ECU (electronic control unit) 40 for use of purifying exhaust gas emitted from a diesel engine (as exhaust gas source, not shown) mounted on a motor vehicle (not shown).

Specifically, a DPF (a diesel particulate filter) 11, an exhaust gas tube (as an exhaust gas passage) 12, a catalyst unit 13, an exhaust gas tube 14 are arranged from the upstream side of the flow of exhaust gas toward the downstream side thereof in order. An additive agent injection valve 16 is a magnetic valve (or a solenoid valve), which electrically operates, mounted on the upper-side wall (referred to as the "side wall" for short) of the exhaust gas tube 12, which is capable of supplying a spray of urea solution to the exhaust gas flowing in the exhaust gas tube 12 located between the DPF 11 and the catalyst unit 13.

The spray of the urea solution is supplied with the exhaust gas by the flow of the exhaust gas to the catalyst in the catalyst unit 13 at the downstream side of the flow of exhaust gas. When the spray of the urea solution reaches the catalyst unit 13, which houses the catalyst, with the flow of exhaust gas, NOx contained in the exhaust gas is reduced (or deoxidized) by reduction reaction of the urea solution and the catalyst in the catalyst unit 13. The exhaust gas is thereby purified.

The DPF 11 is a continuously regenerative filter capable of repeatedly capturing particulate matter (PM) contained in exhaust gas generated immediately following a fuel injection in an engine mounted on a motor vehicle. The DPF 11 is repeatedly regenerated by burning it every regular period of time. The DPF 11 uses oxide catalyst of platinum system capable of capturing and eliminating HC (hydrocarbon) and CO as well as SOF (Soluble Organic Fraction) as PM contained in the exhaust gas.

The catalyst in the catalyst unit 13 promotes reduction reaction of NOx contained in the exhaust gas. The reduction reaction can be expressed by following chemical equations (1) to (3):

$$4NO+4NH_3+O_2 \rightarrow 4N_2+6H_2O \quad (1),$$

$$6NO_2+8NH_3 \rightarrow 7N_2+12H_2O \quad (2), \text{ and}$$

$$NO+NO_2+2NH_3 \rightarrow 2N_2+3H_2O \quad (3).$$

Ammonium ($NH_3$) as a reducer for NOx is generated by hydrolyzing urea. The additive agent injection valve 16 injects a spray of ammonium solution in which ammonium generated is solved, which is mounted on the upstream side of the middle of the exhaust gas tube 12.

The additive agent injection valve 16 has a nozzle 16*a* (as a fine tube) at the front tip thereof. Through the nozzle 16*a* the urea solution as a fuel is injected into the exhaust gas flowing through the exhaust gas tube 12. An outlet opening 16*b* is formed at the outlet surface of the nozzle 16*a*. The urea solution supplied from a urea solution tank 17*a* is injected through the outlet opening 16*b* of the additive agent injection valve 16. The urea solution tank 17*a* continuously supplies the urea solution to the additive agent injection valve 16. In more detail, a pump 17*b* placed in the urea solution tank 17*a* pumps the urea solution to the additive agent injection valve 16 through a urea solution supply pipe 17*c*. A urea solution pressure regulator 17*d* and a urea solution pressure sensor 17*e*, and a filter 17*f* are mounted on the middle of the urea solution supply pipe 17*c*. The filter 17*f* eliminates foreign matters from the urea solution. After eliminating such foreign matters, the urea solution is supplied to the additive agent injection valve 16. The urea solution pressure sensor 17*e* detects a pressure of the urea solution to be supplied to the additive agent injection valve 16. The urea solution pressure regulator 17*d* regulates the pressure of the urea solution. When the pressure of the urea solution exceeds a given value (or a threshold value determined in advance), the urea solution pressure regulator 17*d* returns the urea solution in the urea solution supply pipe 17*c* into the urea solution tank 17*a*.

Figure 2:
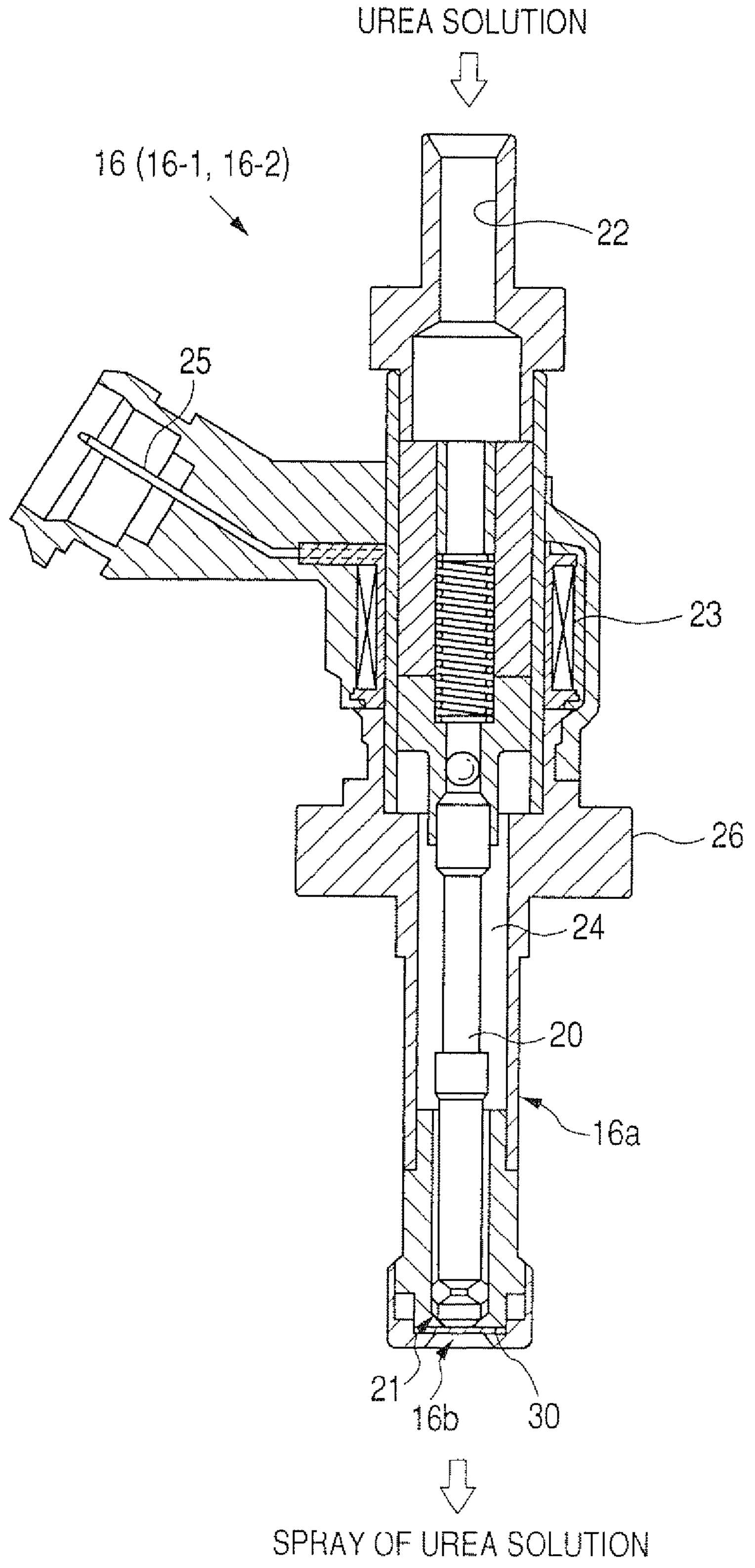
FIG. 2 is a sectional view of an additive agent injection valve mounted on a side wall of an exhaust gas tube in the exhaust gas purifying system according to the embodiment shown in FIG. 1.

FIG. 2 is a sectional view of a configuration of the additive agent injection valve 16 mounted on an exhaust gas tube in the exhaust gas purifying system shown in FIG. 1. The additive agent injection valve 16 is a magnet valve (or a solenoid valve), which electrically operates, like a fuel injection valve for use in gasoline engines.

A needle 20 is incorporated into the nozzle 16*a* positioned at a front side of the additive agent injection valve 16. The needle 20 is slidably guided in the axial direction of a body part 26 of the additive agent injection valve 16 and placed on a valve pedestal 21 formed in the body part 26. At the downstream side of the valve pedestal 21, outlet opening 16*b* is formed. A plate member 30 of a circular-disk shape having a plurality of injection holes is placed in the additive agent injection valve 16 of the exhaust gas purifying system according to the embodiment of the present invention.

A solenoid magnet 23 is placed at the upper side of the nozzle 16*a* and becomes active on receiving a control signal transferred from a controller (not shown) through a terminal 25. An inlet 22 communicated with a passage 24 formed between the needle 20 and the body 26 is further communicated with the urea solution supply pipe 17*c*. This configuration of the additive agent injection valve 16 enables the urea solution adjusted by the regulator 17*d* to be supplied to the valve pedestal 21 of the needle 20 through the inlet 22 and the passage 24.

On receiving the control signal transferred from the ECU 40, the solenoid magnet 23 in the additive agent injection valve 16 having the above configuration enables the needle 20 to move toward the upper direction as an opening direction. The urea solution reaching to the valve pedestal 21 adjusted by the regulator 17*d* forcedly injects toward the downstream side through the needle 20 and the valve pedestal 21. The urea through the needle 20 and the valve pedestal 21 is then injected into the exhaust gas pipe 12 through the plurality of outlet openings 16*b* (as plural injection holes formed in the plate member 30).

The front part of the additive agent injection valve 16 is inserted into a mounting part formed right above (in the vertical direction) at the center of the axis of the exhaust gas tube 12. The injection valve 16 is so mounted on the passage wall of the exhaust gas tube 12 of a straight pipe shape that it is positioned in the vertical direction (Y direction shown in FIG. 1) to the center line of the flow of exhaust gas in the exhaust gas tube 12. That is, it is inserted in the direction vertical to the flow of exhaust gas (X direction shown in FIG. 1) in the exhaust gas tube 12. The additive agent injection valve 16 basically injects the spray of urea solution in the Y direction shown in FIG. 1.

On the other hand, the exhaust gas tube 14 at the downstream side of the catalyst unit 13 is equipped with an exhaust gas sensor 18 incorporating both a NOx sensor and an exhaust gas temperature sensor. The exhaust gas sensor 13 is capable of measuring the amount of NOx contained in the exhaust gas (which is equal to a purifying ratio of NOx by the catalyst in the catalyst unit 13) and a temperature of the exhaust gas.

An ammonium elimination unit (containing oxidizing catalyst, for example) capable of eliminating remaining ammonia, an ammonia sensor for detecting the amount of ammonia contained in the exhaust gas, and the like are selectively placed at the downstream side of the exhaust gas tube 14. The ECU (electronic control unit) 40 controls the operation of the additive agent injection valve 16 capable of injecting the urea solution as additive agent during the exhaust gas purification. The ECU 40 is equipped with a microcomputer (not shown) and operates various types of actuators such as the additive agent injection valve 16 with corresponding manners based on the detection values of those sensors. Specifically, the ECU 40 controls the operation period of time of the additive agent injection valve 16 and the drive amount of the pump **17*b* in order to supply an optimum amount of spray of the urea solution (as additive agent) at an optimum timing to the exhaust gas flowing through the exhaust gas tube 12**.

The additive agent injection valve 16 having the above configuration supplies the spray of urea solution to the exhaust gas which flows through the exhaust gas tube 12. The spray of urea solution is carried out with the flow of the exhaust gas into the catalyst unit 13. NOx contained in the exhaust gas is reduced in reduction reaction with the urea solution and catalyst accommodated in the catalyst unit 13.

The reduction reaction of NOx is expressed by following chemical equation (4).

$$(NH_2)_2CO+H_2O \rightarrow 2NH_3+CO_2 \quad (4).$$

As shown in chemical equation (4), the urea solution is hydrolyzed with thermal energy of the exhaust gas to generate ammonium ($NH_3$), and when ammonium is added into NOx contained in the exhaust gas, which is selectively absorbed on the catalyst in the catalyst unit 13. The reduction reaction with ammonium expressed by chemical equations (1) to (3) described above is performed. As a result, the NOx is reduced and thereby purified.

Next, a description will now be given of an exhaust gas purifying operation by the exhaust gas purifying system equipped with the additive agent injection valve 16 according to the embodiment of the present invention with reference to FIG. 3A, FIG. 3B, and FIG. 4.

Figure 3A:
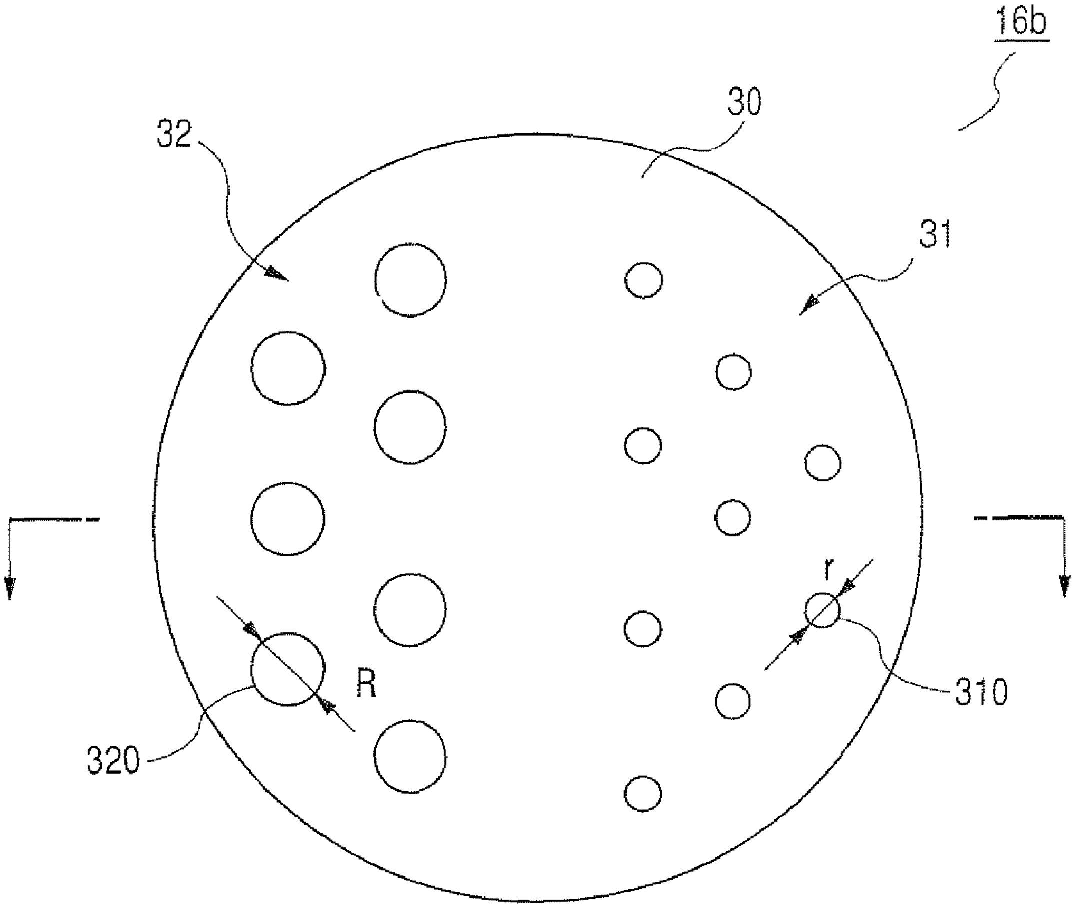
FIG. 3A is a plan view showing a configuration of a plate member incorporated into the additive agent injection valve in the exhaust gas purifying system according to the embodiment shown in FIG. 1.

FIG. 3A is a plan view showing a configuration of the plate member 30 incorporated into the additive agent injection valve 16 in the exhaust gas purifying system according to the embodiment shown in FIG. 1. FIG. 3B is a sectional view of the plate member 30 shown in FIG. 3A. FIG. 4 is a schematic view showing a manner of purifying exhaust gas using the plate member 30 shown in FIG. 3A and FIG. 3B.

Figure 3B:
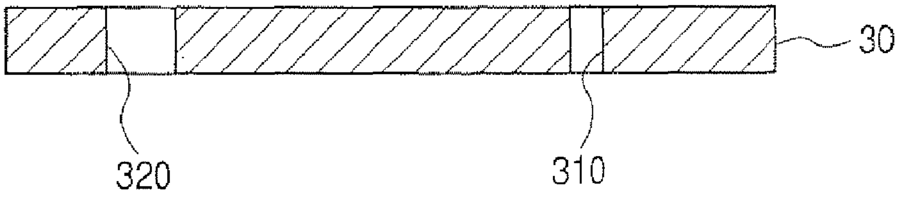
FIG. 3B is a sectional view of the plate member shown in FIG. 3A.

As shown in FIG. 3A and FIG. 3B, the plate member 30 in the additive agent injection valve 16 has a first injection part 31 and a second injection part 32. The first injection part 31 is composed of a plurality of first injection holes 310. Each first injection hole 310 has a given hole diameter "r". The second injection part 32 is composed of a plurality of second injection holes 320. Each second injection hole 320 has a given hole diameter "R" which is greater in size than the hole diameter "r" of each first injection hole 310.

Those first and second injection holes 310 and 320 are formed in parallel to the axis direction of the plate member 30. The plate member 30 incorporated into the additive agent injection valve 16 enables the direction of the spray of urea solution to be injected through the first and second injection holes 310 and 320 to be approximately parallel to the axial center.

As described above, it is so formed that the injection diameter "R" of the second injection hole 320 is greater than the injection diameter "r" of the first injection hole 310. The spray of urea solution injected from the plural second injection holes 320 (this spray will also be referred to as the "second spray 321") has a large penetration (or traveling) force when compared with the spray of urea solution injected from the plural first injection holes 310 (this spray will also be referred to as the "first spray 311").

Figure 4:
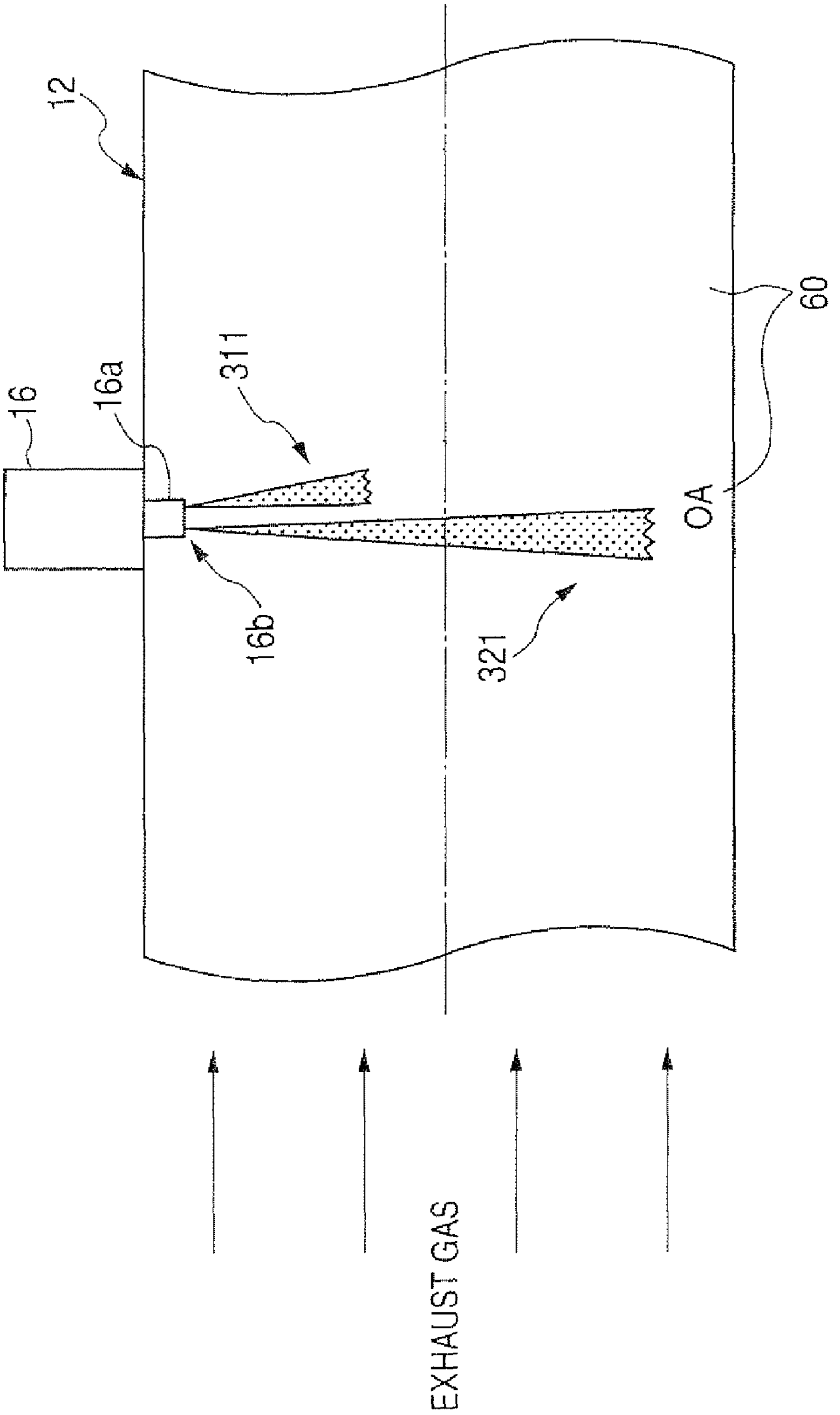
FIG. 4 is a schematic view showing a manner of purifying exhaust gas using the plate member shown in FIG. 3A in the exhaust gas purifying system according to the embodiment of the present invention.

Accordingly, as shown in FIG. 4, the traveling distance of the second spray 321 in the exhaust gas tube 12 becomes larger than that of the first spray 311. This enables the second spray 321 to reach the opposite area OA in the passage area 60, which is opposed in position to the area at which the additive agent injection valve 16 is mounted.

On the other hand, it is so set that the traveling distance of the first spray 311 is smaller than the traveling distance of the second spray 321. This makes it possible to adequately supply the spray of urea solution to the passage area in the exhaust gas tube 12 where the additive agent injection valve 16 is mounted.

As described above in detail, the first injection hole group 31 and the second injection hole group 32 are formed in the plate member 30 in order to have a different traveling distance. This makes it possible to spray the urea solution in the sectional entire area of the exhaust gas tube 12. After spraying the urea solution from both the first injection holes 310 and the second injection holes 320 into the sectional entire area of the exhaust gas tube 12, the spray of the urea solution travels with the flow of the exhaust gas and reaches the upstream side of the catalyst unit 13. Accordingly, because the urea solution injected from the first and second injection holes 310 and 320 is sprayed into the entire of the catalyst in the catalyst unit 13, it is possible to perform the reduction reaction of NOx using the entirety of the catalyst in the catalyst unit 13. This enables the catalyst in the catalyst unit 13 to more adequately promote its catalyst purifying property.

In particular, having the large penetration force of the second spray 321 injected by the second injection hole group 32 rather than that of the first spray 311 injected from the first injection hole group 31 enables the spray of urea solution to overcome the resistance to the flow of exhaust gas in the exhaust gas tube 12 and to surely reach the end surface of the catalyst unit 13, at the downstream side of the passage area 60 in the exhaust gas tube 12. This makes it possible to more adequately achieve the purifying property of catalyst in the catalyst unit 13.

As described above, since the first spray 311 and the second spray 321 having a different traveling distance are injected from the plate member 30 and this enables the urea solution to be sprayed to the entirety of the catalyst accommodated in the catalyst unit 13, it is not necessary to place a deflector and the like so as to change the spraying direction of urea solution injected by the injection valve as disclosed in the Japanese patent kohyo No. JP 2001-5166335.

The embodiment described above has the configuration to have the same direction of both the first spray 311 and the second spray 321. In this case, as shown in FIG. 4, the additive agent injection valve 16 having the plate member 30 is so mounted on the exhaust gas tube 12 that the second spray 321 is positioned at the upstream side rather than the first spray 311 observed from the flow of the exhaust gas. The relationship in position between the first injection holes 310 and the second injection holes 320 enables the second spray 321 to overcome the resistance of the exhaust gas flow and to reach the opposite area to the area where the additive agent injection valve 16 is mounted. Accordingly, even if the first injection holes 310 and the second injection holes 320 have a same injection-direction, it is possible to adequately promote the exhaust gas purifying property of the catalyst in the catalyst unit 13.

According to the concept of the present exemplary embodiment, it is possible to have various modifications as follows.

(First Modification)

Figure 5A:
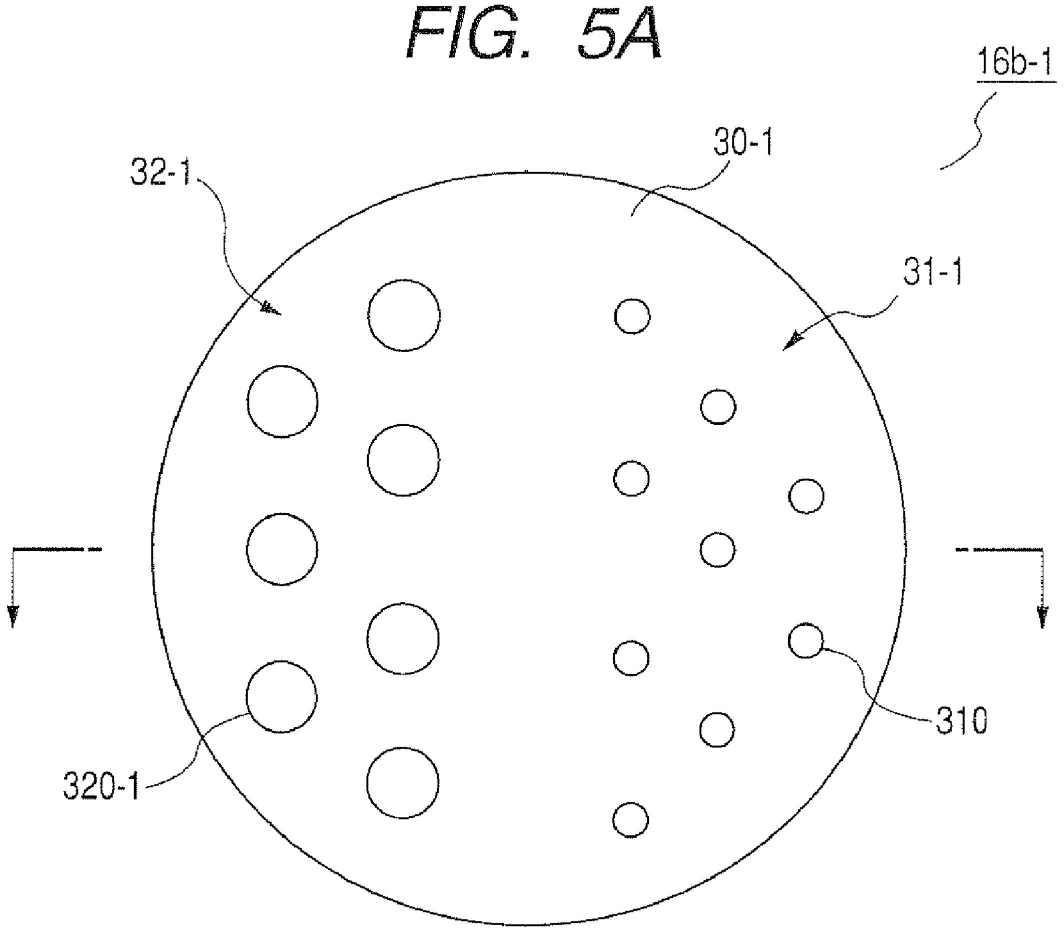
FIG. 5A is a plan view showing another modified configuration of the plate member incorporated into the additive agent injection valve in the exhaust gas purifying system according to the embodiment of the present invention.
Figure 5B:
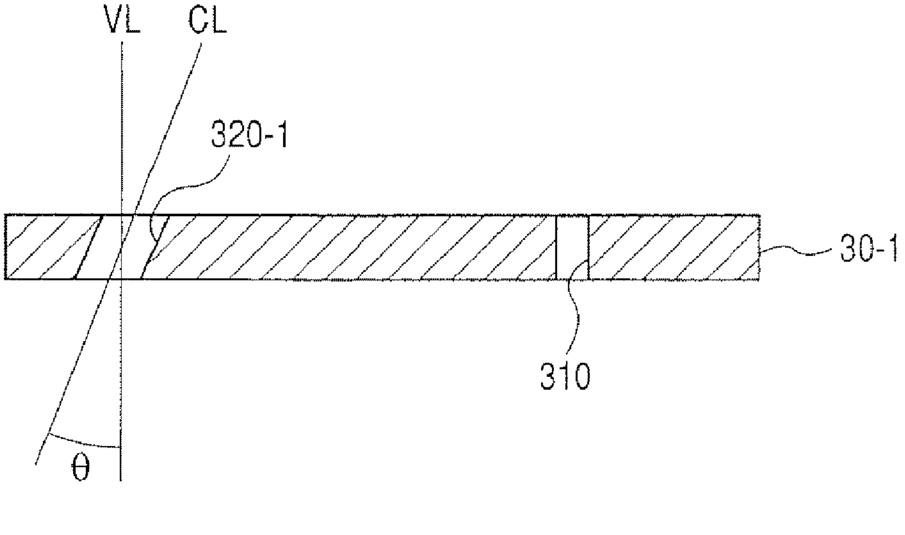
FIG. 5B is a sectional view of the plate-member shown in FIG. 5A.
Figure 6:
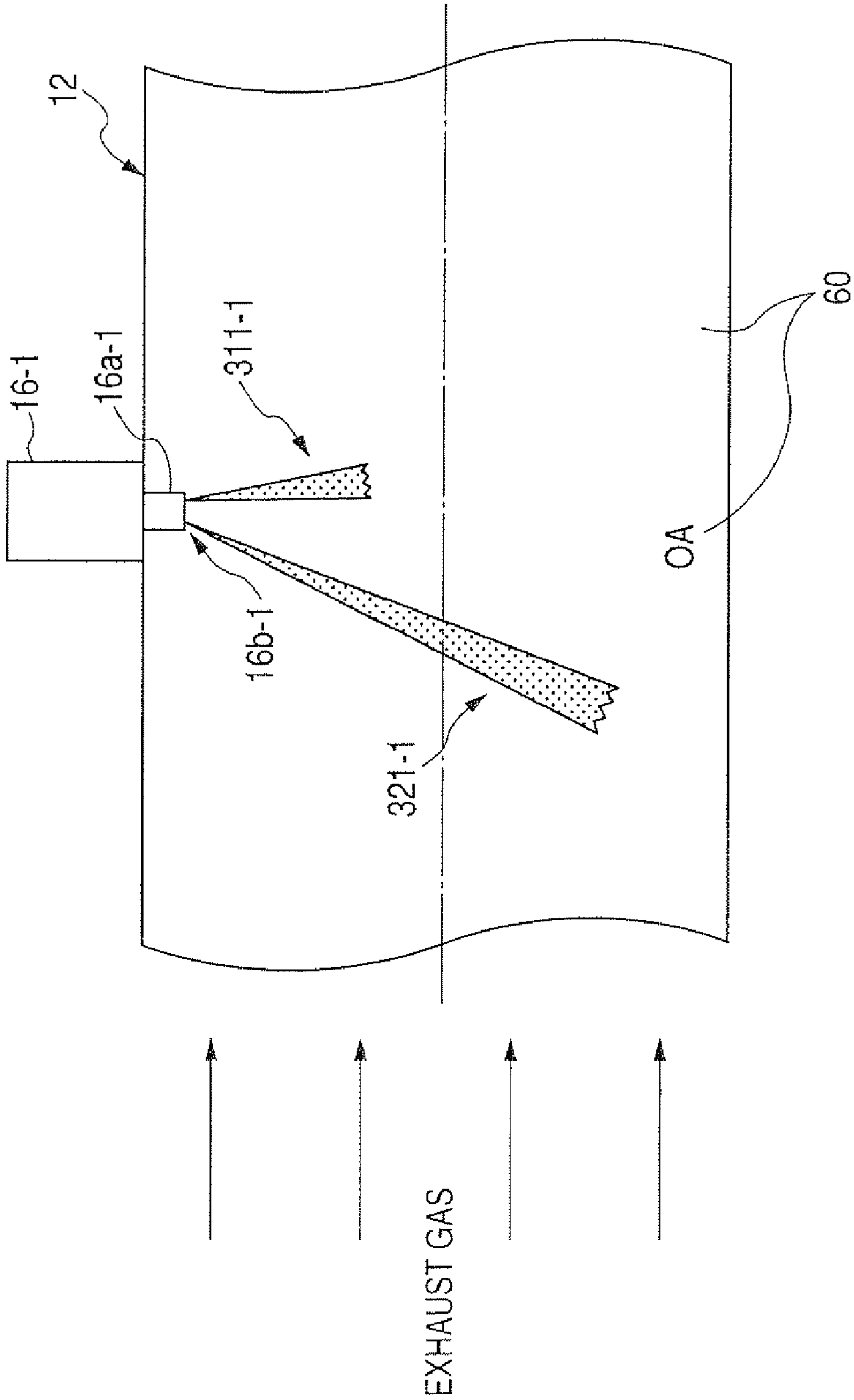
FIG. 6 is a schematic view showing a manner of purifying exhaust gas using the plate member shown in FIG. 5A in the exhaust gas purifying system according to the embodiment of the present invention.

FIG. 5A is a plan view showing a modified configuration of the plate member 30-1 incorporated into the additive agent injection valve 16-1 in the exhaust gas purifying system according to the embodiment of the present invention. FIG. 5B is a sectional view of the plate member 30-1 shown in FIG. 5A. FIG. 6 is a schematic view showing a manner of purifying exhaust gas using the plate member 30-1 shown in FIG. 5A in the exhaust gas purifying It is possible for the second injection holes capable of injecting the second spray of urea solution toward the upstream side of the exhaust gas flow in the exhaust gas tube 12 considering from a viewpoint to adequately mix the spray of urea solution and the exhaust gas and to keep an adequate interval between the first spray 311 and the second spray 321 in the exhaust gas flow, as shown in FIG. 5A, FIG. 5B, and FIG. 6.

That is, as shown in FIG. 5B, the center line CL of the opening of each second injection hole 320-1 is tilted by angle θ to the vertical line VL which is vertical to the horizontal surface of the plate member 30-1. As shown in FIG. 6, the additive agent injection valve 16-1 with the plate member 30-1 is so incorporated into the exhaust gas tube 12 that the injection position of the second spray 321-1 to be injected by the second injection holes 320-1 is positioned at the upstream side of the exhaust gas flow when compared with the injection position of the second spray 311-1 to be injected by the first injection holes 310-1.

This configuration of the additive agent injection valve 16-1 ensures that the second spray 321-1 injected through the second injection hole 320-1 reaches the opposite area OA in the passage area 60 in the exhaust gas tube 12, which is opposed to the area in which the additive agent injection valve 16-1 is mounted, and the second spray 321-1 of the opposite area OA in the passage area 60 and the exhaust gas are surely mixed even if the additive agent injection valve 16-1 is vertically mounted on the exhaust gas tube 12 or there is a short distance between the additive agent injection valve 16-1 and the catalyst unit 13.

(Second Modification)

Figure 7A:
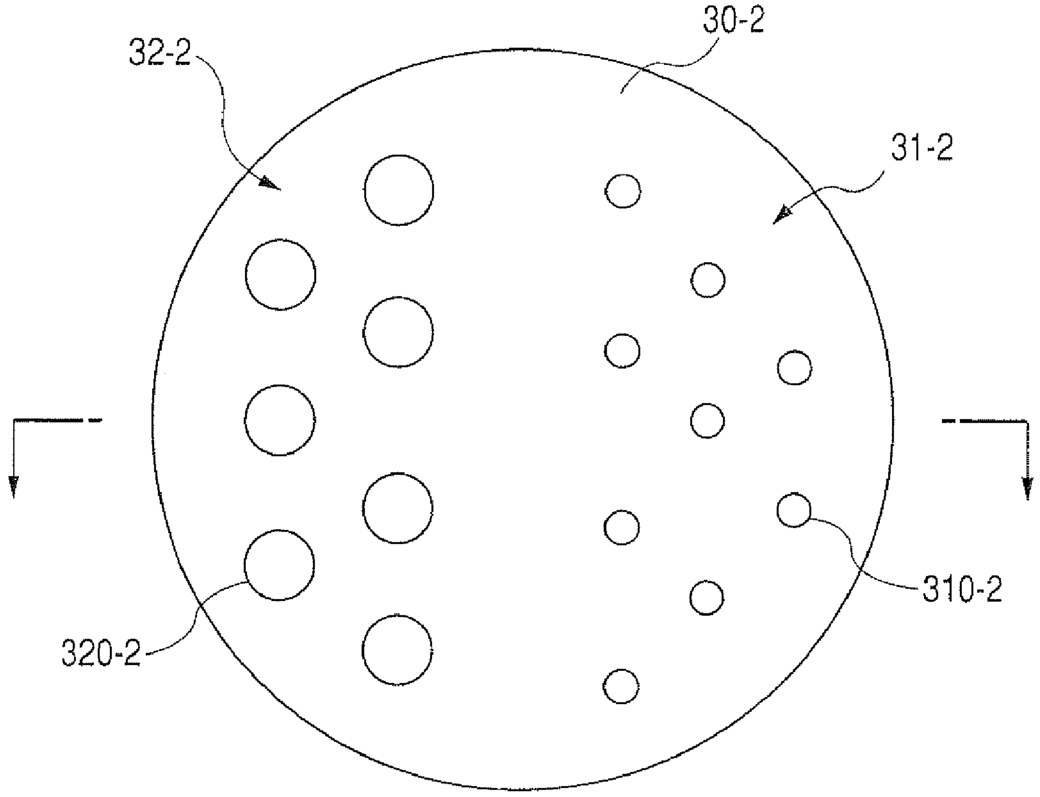
FIG. 7A is a plan view showing another modified configuration of the plate member incorporated into the additive agent injection valve in the exhaust gas purifying system according to the embodiment of the present invention.
Figure 7B:
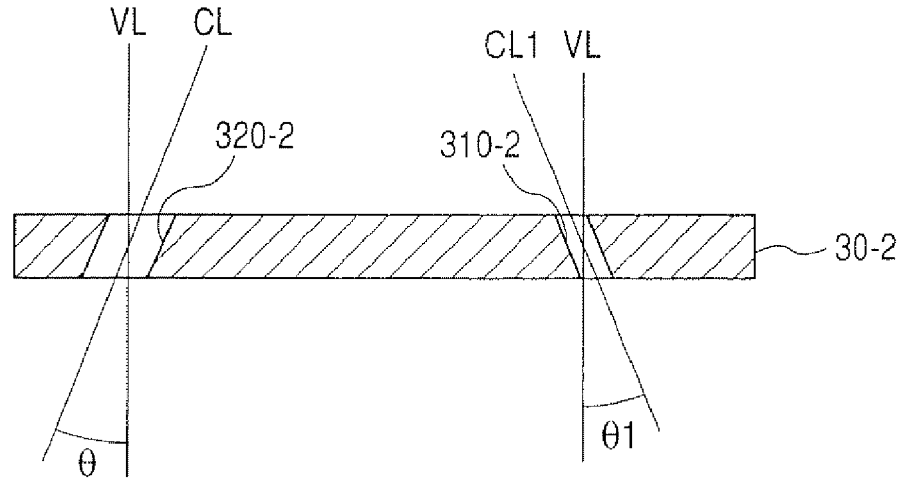
FIG. 7B is a sectional view of the plate member shown in FIG. 7A.
Figure 8:
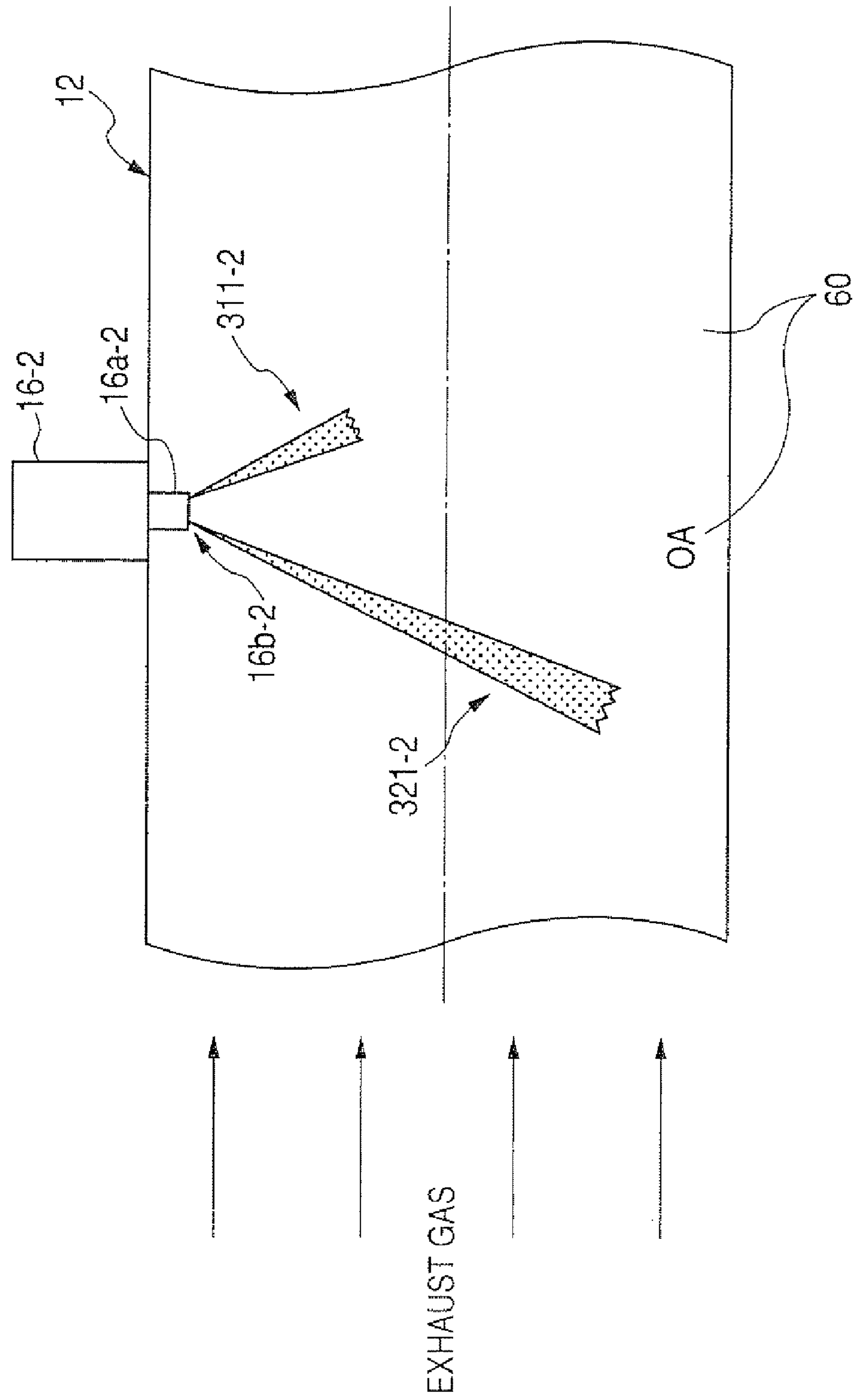
FIG. 8 is a schematic view showing a manner of purifying exhaust gas using the plate member shown in FIG. 7A in the exhaust gas purifying system according to the embodiment of the present invention.

FIG. 7A is a plan view showing another modified configuration of the plate member 16b-2 incorporated into the additive agent injection valve 16-2 in the exhaust gas purifying system according to the embodiment of the present invention. FIG. 7B is a sectional view of the plate member 16*b*-2 shown in FIG. 7A. FIG. 8 is a schematic view showing a manner of purifying exhaust gas using the plate member 16*b*-2 shown in FIG. 7A in the exhaust gas purifying system.

As shown in FIG. 7A, FIG. 7B, and FIG. 8, it is further possible to inject the first spray 311-2 toward the downstream of the exhaust gas in addition to the configuration shown in FIG. 5B. This configuration shown in FIG. 7A, FIG. 7B, and FIG. 8 needs to tilt the center line CL1 of the opening of each first injection hole 310-2 by angle θ1 to the vertical line VL of the horizontal surface of the plate member 30-2.

This configuration enables that the first injection holes 310-2 can spray the urea solution to, namely, the first spray 311-2 can reach, the area near the surface wall of the exhaust gas tube 12 on which the additive agent injection valve 16-2 is mounted. This configuration can increase the spray distribution of the urea solution toward the end surface of the exhaust gas tube 12 at the upstream side of the catalyst unit 13.

(Third Modification)

Figure 9A:
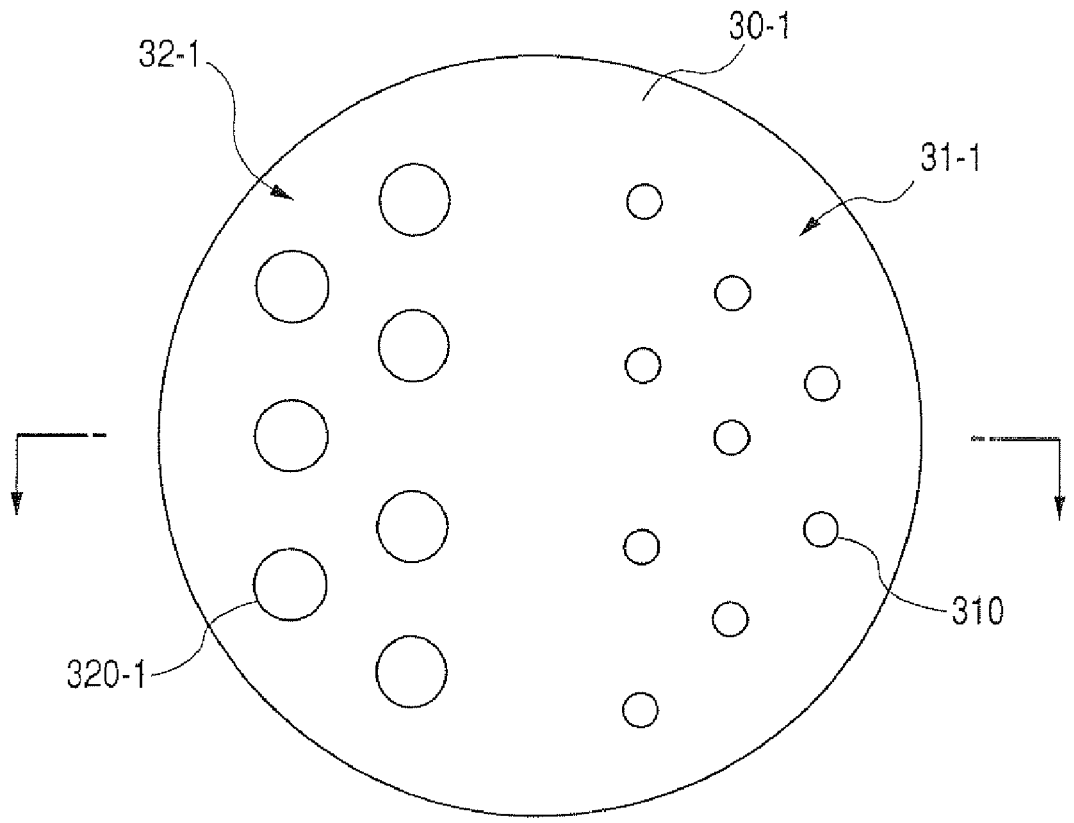
FIG. 9A is a plan view showing another modified configuration of the plate member incorporated into the additive agent injection valve is the exhaust gas purifying system according to the embodiment of the present invention.
Figure 9B:
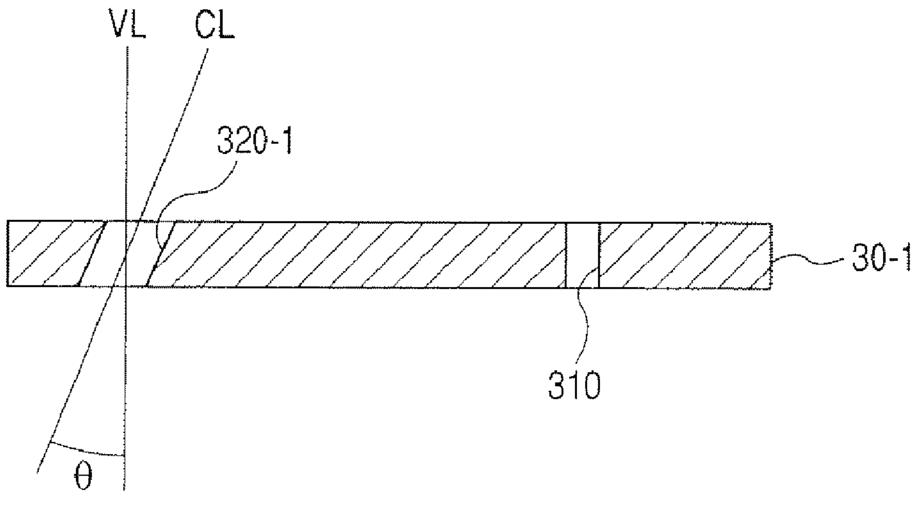
FIG. 9B is a sectional view of the plate member shown in FIG. 9A.
Figure 10:
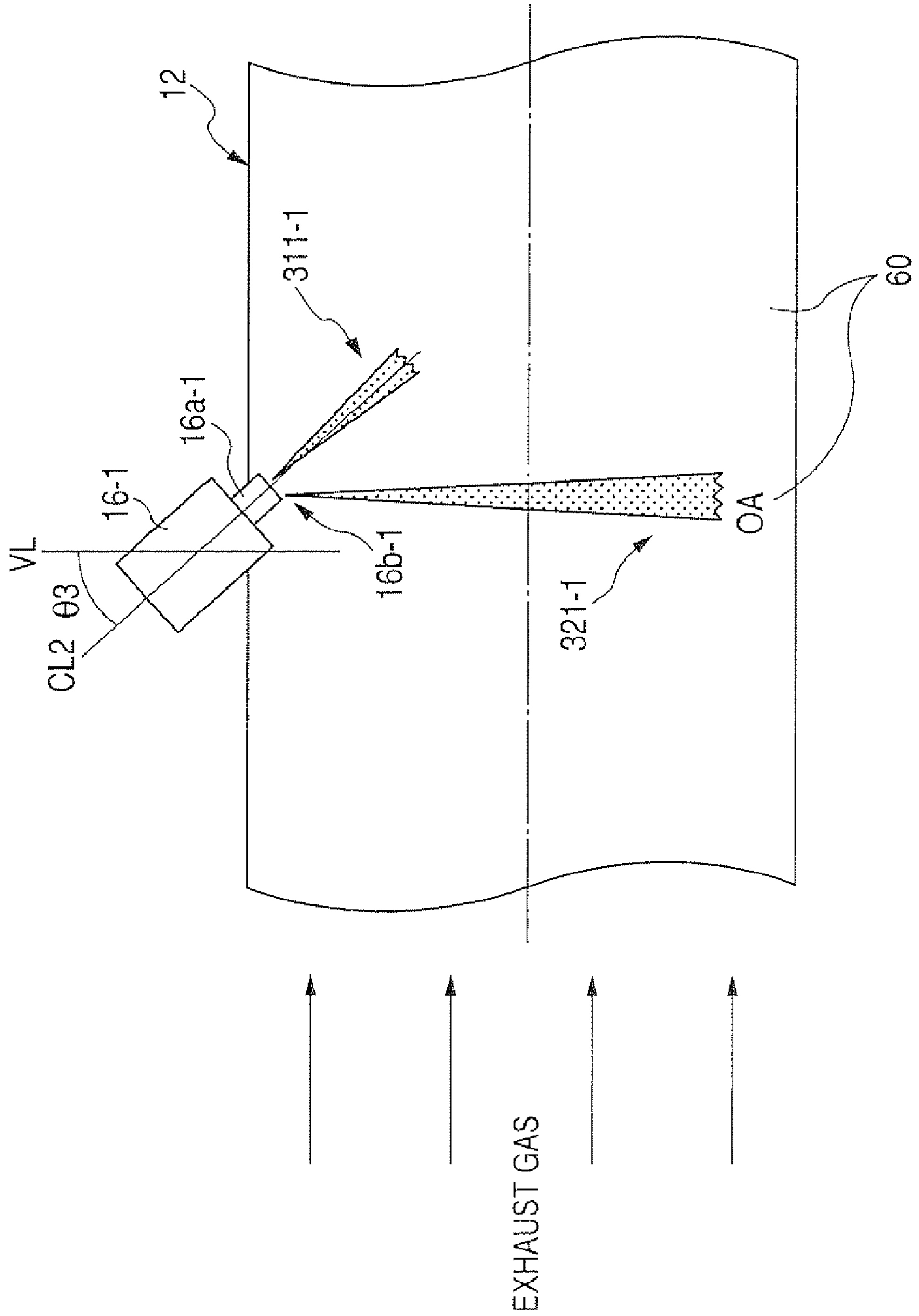
FIG. 10 is a schematic view showing a manner of purifying exhaust gas using the plate member shown in FIG. 9A in the exhaust gas purifying system according to the embodiment of the present invention.

FIG. 9A is a plan view showing another modified configuration of the plate member incorporated into the additive agent injection valve in the exhaust gas purifying system according to the embodiment of the present invention. FIG. 9B is a sectional view of the plate member 30-1 shown in FIG. 9A. FIG. 10 is a schematic view showing a manner of purifying exhaust gas using the plate member 30-1 shown in FIG. 9A in the exhaust gas purifying system according to the embodiment of the present invention.

As shown in FIG. 10, it is possible to tilt the additive agent injection valve 16-1, mounted on the exhaust gas tube 12, toward the downstream side of the flow of exhaust gas, namely, toward the upstream side of the catalyst unit 13.

Like the configuration of the additive agent injection valve 16-1 in the first modification shown in FIG. 5B, the center line CL of the opening of each second injection hole 320-1 is tilted by angle θ to the vertical line VL of the horizontal surface of the plate member 30-1. As shown in FIG. 10, the additive agent injection valve 16-1 with the plate member 30-1 is so mounted on the exhaust gas tube 12 that the injection position of the second spray 321-1 to be injected through the second injection holes 320-1 is positioned at the upstream side of the exhaust gas flow. Even if the additive agent injection valve 16-1 is tilted toward the downstream direction of the exhaust gas flow, as shown in FIG. 10, it is possible to keep an adequate distance in order that the second spray 321-1 injected through the second injection hole 320-1 adequately reaches the opposite area OA in the passage area 60 of the exhaust gas tube 12 and the exhaust gas can be surely and adequately mixed before the spray of the urea solution reaches the catalyst unit 13.

(Fourth Modification)

Figure 11A:
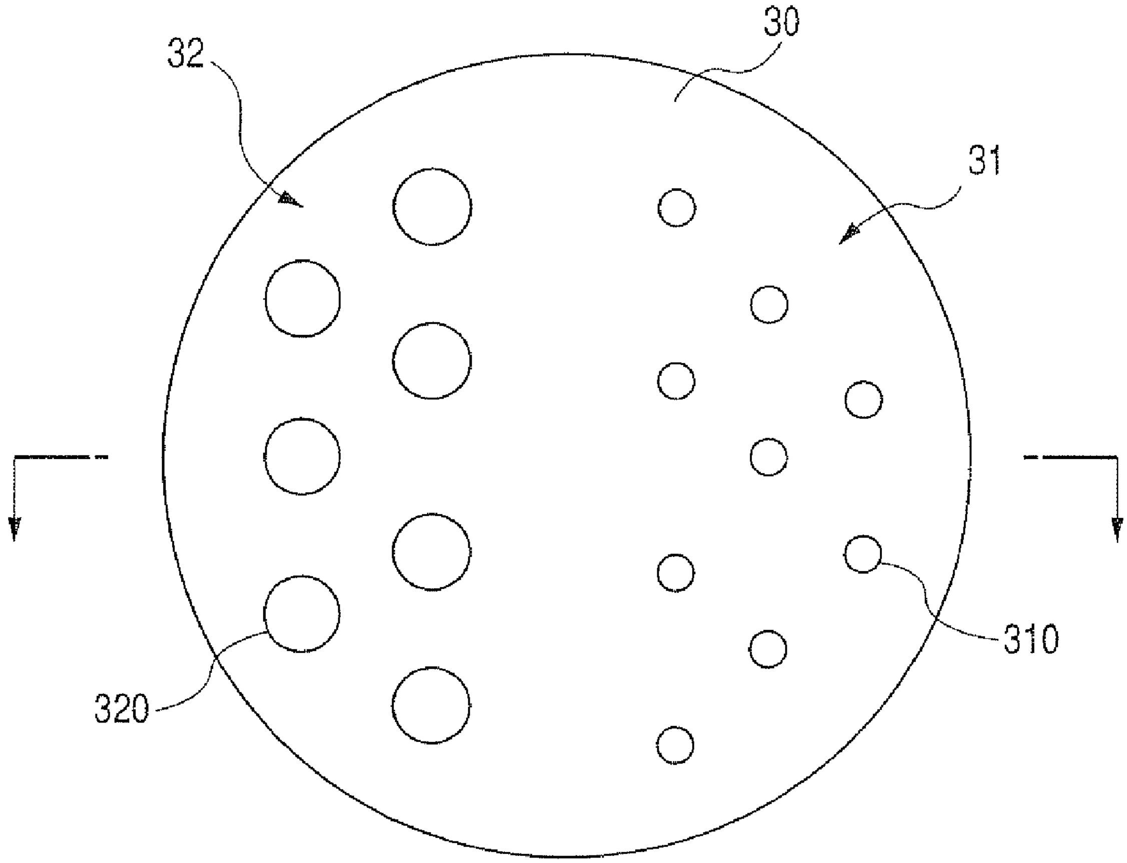
FIG. 11A is a plan view showing another modified configuration of the plate member incorporated into the additive agent injection valve in the exhaust gas purifying system according to the embodiment of the present invention.
Figure 11B:
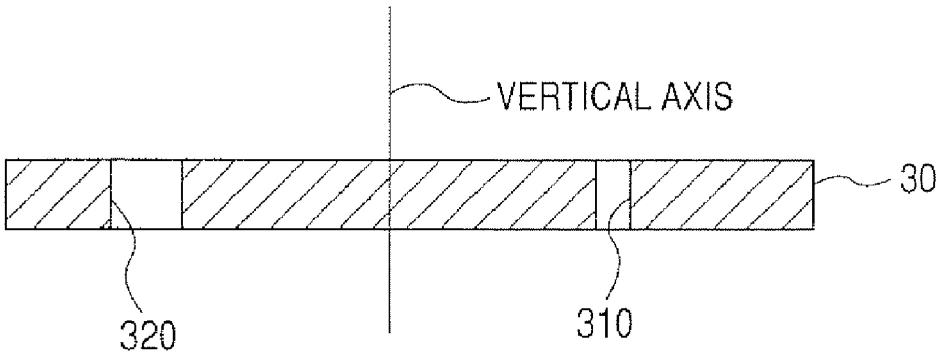
FIG. 11B is a sectional view of the plate member shown in FIG. 11A.
Figure 12:
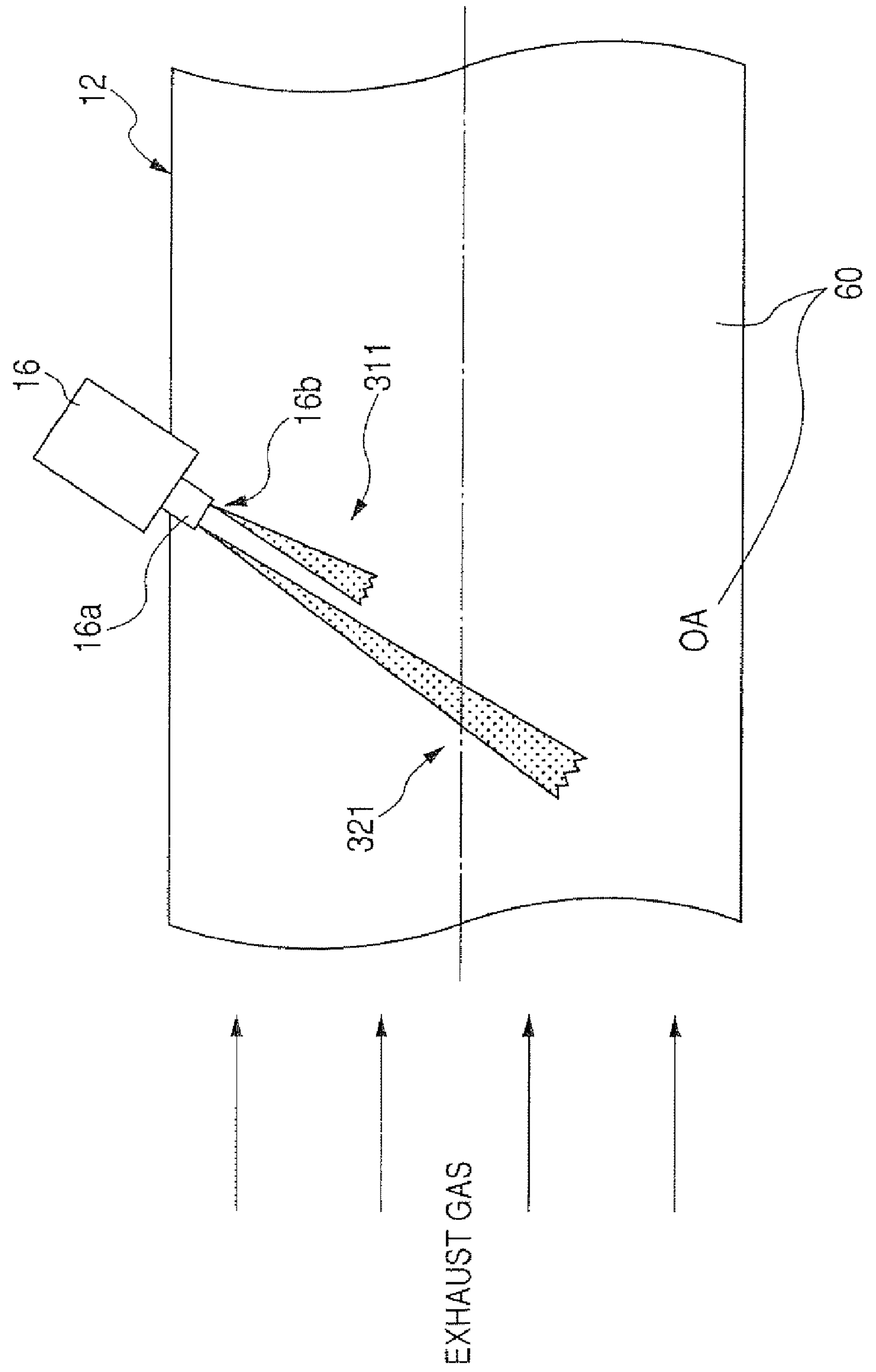
FIG. 12 is a schematic view showing a manner of purifying exhaust gas using the plate member shown in FIG. 11A in the exhaust gas purifying system according to the embodiment of the present invention.

FIG. 11A is a plan view showing another modified configuration of the plate member incorporated into the additive agent injection valve in the exhaust gas purifying system according to the embodiment of the present invention. FIG. 11B is a sectional view of the plate member 30 shown in FIG. 11A. FIG. 12 is a schematic view showing a manner of purifying exhaust gas using the plate member 30 shown in FIG. 11A in the exhaust gas purifying system according to the embodiment of the present invention.

When the additive agent injection valve 16 is tilted toward the upstream side of the exhaust gas flow, as shown in FIG. 12, the second spray 321 is sprayed toward the upstream side of the exhaust gas flow. Therefore even if the first injection holes 310 and the second injection holes 320 are formed in parallel to the vertical axis of the plate member 30, in other words, even if those are formed vertical to the horizontal surface of the plate member 30, as shown in FIG. 11A and FIG. 11B, it is possible to keep an adequate distance in order that the second spray 321 injected through the second injection hole 320 adequately reaches the opposite area OA in the passage area 60 of the exhaust gas tube 12 and the exhaust gas are surely and adequately mixed before the spray of the urea solution reaches the catalyst unit 13. This configuration makes it possible to easily form the first injection holes 310 and the second injection holes 320 in the plate member 30.

As described above in detail, according to the present invention, the plate member has two types of injection holes having a different diameter such as the first injection holes and the second injection holes. According to the present invention, it is possible to easily change and adjust the diameter and angle of each injection hole in the plate member without changing the design of the entire configuration of the injection valve itself. The injection valve with the injection holes having the configurations according to the present invention described above has a high adaptability to and can easily cope with various engines and injection valves having different specifications (such as various mounting angles of the injection valve on the exhaust gas tube and various specifications of injection manners).

(Other Modifications)

It is further possible to have other configurations of the exhaust gas purifying system in which the first injection valve and the second injection valve are independently mounted on the exhaust gas tube 12, as shown in FIG. 13A to FIG. 13E.

FIG. 13A to FIG. 13E are schematic views showing other modifications of the exhaust gas purifying system capable of purifying exhaust gas according to the present invention.

Figure 13A:
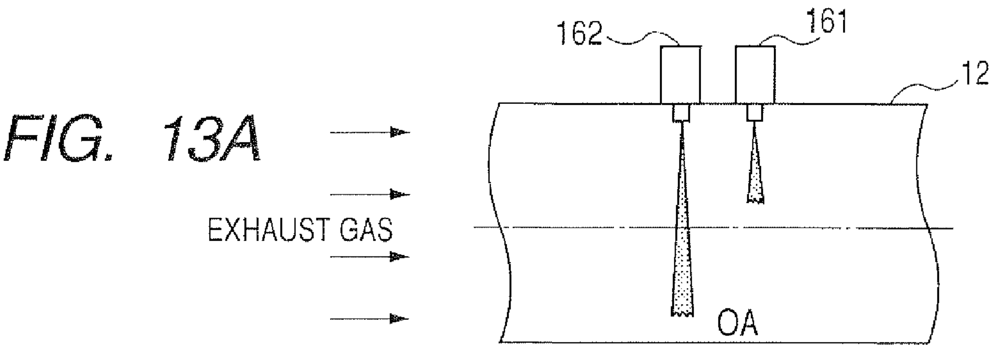
FIG. 13A to FIG. 13E are schematic views showing other modifications of the exhaust gas purifying system capable of purifying exhaust gas according to the present invention.

FIG. 13A shows the configuration of the first injection valve 161 and the second injection valve 162 which are vertically mounted on the side wall of the exhaust gas tube 12.

Figure 13B:
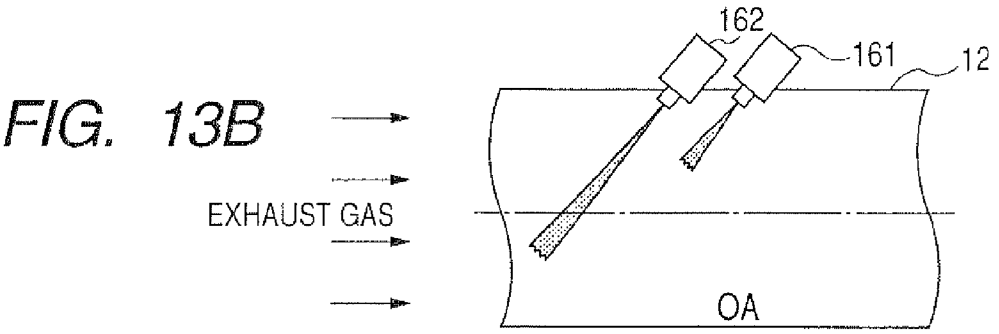

FIG. 13B shows the configuration of the first injection valve 161 and the second injection valve 162 mounted on the side wall of the exhaust gas tube 12, in which both the first and second injection valves 161 and 162 are tilted toward the upstream side of the exhaust gas flow.

Figure 13C:
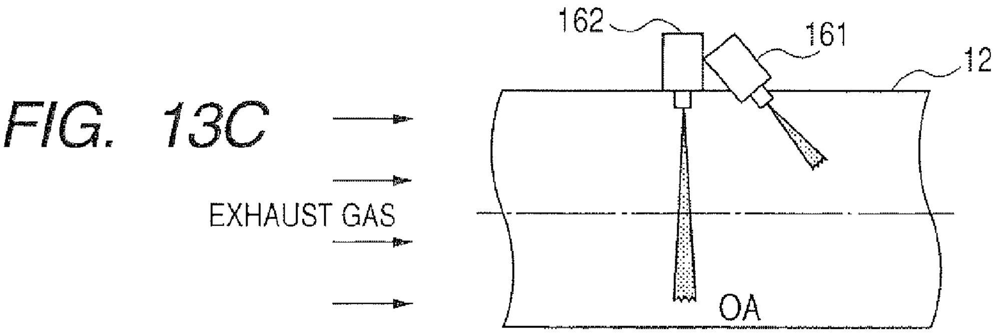

FIG. 13C shows the configuration of the first injection valve 161 and the second injection valve 162 mounted on the side wall of the exhaust gas tube 12, in which the first injection valve 161 is vertically mounted on the side wall of the exhaust gas tube 12 and the second injection valve 162 is tilted toward the downstream side of the exhaust gas flow.

Figure 13D:
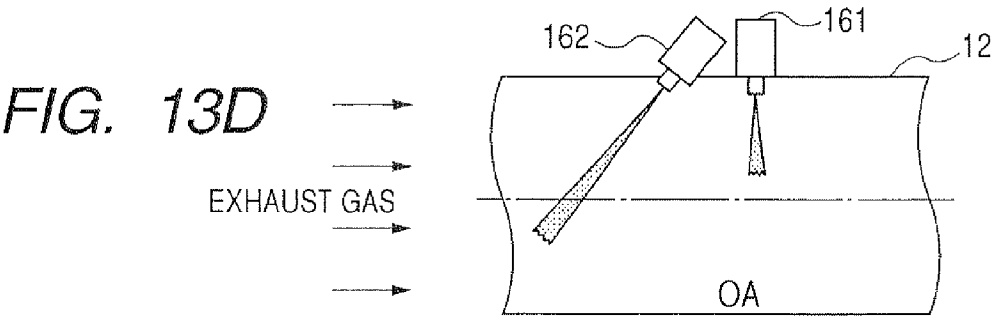

FIG. 13D shows the configuration of the first injection valve 161 and the second injection valve 162 mounted on the side wall of the exhaust gas tube 12, in which the first injection valve 161 is tilted toward the upstream side of the exhaust gas flow and the second injection valve 161 is vertically mounted on the side wall of the exhaust gas tube 12.

Figure 13E:
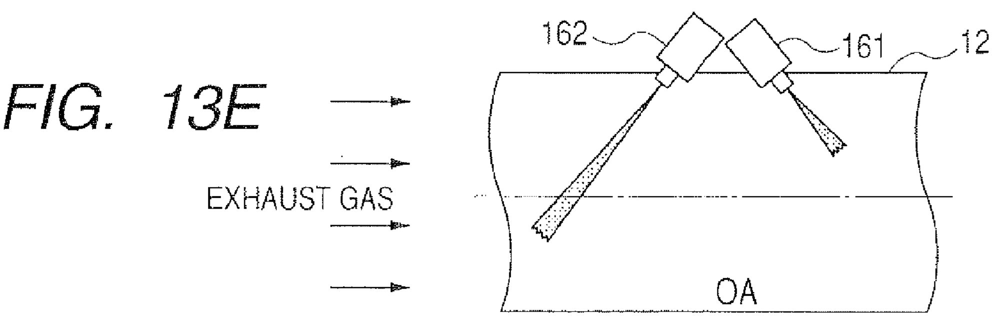

FIG. 13E shows the configuration of the first injection valve 161 and the second injection valve 162 mounted on the side wall of the exhaust gas tube 12, in which the first injection valve 161 is tilted toward the downstream side of the exhaust gas flow and the second injection valve 162 is tilted toward the upstream side of the exhaust gas flow.

Those configurations of the first injection valve 161 and the second injection valve 162 have a high adaptability to various specifications such as various types of engines and can flexibly adjust the spray of urea solution to be sprayed into the exhaust gas which flows through the exhaust gas tube 12.

Still further, it is possible to have other manners to provide the first spray and the second spray which are a different traveling distance in the exhaust gas tube 12.

For example, it is possible to change the thickness of parts in the plate member in the axis direction thereof in order to supply the first spray and the second spray having a different traveling distance in the exhaust gas tube 12. Specifically, it is possible to use the plate member having the first part and the second part of a different thickness in order to achieve this function. The first injection hole capable of supplying the spray of urea solution of a short traveling distance is formed in the first part of the plate member. The second injection hole capable of supplying the spray of urea solution of along traveling distance is formed in the second part of the plate member. This configuration having the first part and second parts of the different thickness can provide the first spray and the second spray having a different traveling distance even if both the first injection hole and the second injection hole have a same diameter.

Although the embodiment and the various modifications described above provide the first spray and the second spray, it is further possible to use another spray of urea solution having a different traveling distance in addition to the first spray and the second spray. This configuration enables the urea solution to be more uniformly sprayed into the exhaust gas tube 12.

Although the exhaust gas purifying system according to the present invention is applied to the urea SCR (selective catalyst reduction) system in the description according to the embodiment and modifications described above, it is possible to apply the exhaust gas purifying system of the present invention to various applications unless the exhaust gas purifying system purifies exhaust gas using same additive agent and catalyst.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An exhaust gas purifying system comprising:

an additive agent injection valve, mounted on a passage wall of an exhaust gas passage through which exhaust gas as a target in purification passes, capable of injecting an additive agent into the exhaust gas passage; and a catalyst unit having catalyst, placed in a downstream side of the additive agent injection valve in the exhaust gas passage, capable of promoting an exhaust gas purifying reaction using at least the additive agent transported from the additive agent injection valve to the catalyst unit through the exhaust gas flow, wherein the additive agent injection valve comprises:

a first spray injection part for injecting a first spray of the additive agent having a first traveling distance into the exhaust gas passage; and a second spray injection part placed at the upstream side of the exhaust gas flow in the exhaust gas passage when compared with the position of the first spray infection part, which injects a second spray of the additive agent having a second traveling distance, which is greater than the first traveling distance, in the exhaust gas passage.

2. The exhaust gas purifying system according to claim 1, wherein the first spray injection part and the second spray injection part inject the first spray of the additive agent and the second spray of the additive agent, respectively, in a same direction.

3. The exhaust gas purifying system according to claim 1, wherein the second spray injection part injects the spray of the additive agent toward the upstream side of the exhaust gas flow when compared with the direction of the first spray of the additive agent injected by the first spray injection part.

4. The exhaust gas purifying system according to claim 1, wherein the second spray of the additive agent injected by the second spray injection part is supplied into the upstream side of the exhaust gas flow observed from the vertical direction of the exhaust gas flow.

5. The exhaust gas purifying system according to claim 1, wherein the first spray injection part comprises a plurality of first injection holes through which the first spray of the additive agent is provided; and the second spray injection part comprises a plurality of second injection holes through which the second spray of the additive agent is provided, the diameter of each second injection hole being greater than the diameter of each first injection hole.

6. The exhaust gas purifying system according to claim 5, wherein the additive agent injection valve has a plate member in which the first injection holes and the second injection holes are formed.

7. The exhaust gas purifying system according to claim 6, wherein the first injection holes and the second injection holes are formed with an axis perpendicular with respect to a surface of the plate member.

8. The exhaust gas purifying system according to claim 6, wherein the first injection holes and the second injection holes are formed in the plate member to direct each first injection hole differently than each second injection hole.

9. The exhaust gas purifying system according to claim 1, wherein the additive agent injection valve is formed to have an axis direction of the additive agent injection valve perpendicular with respect to the exhaust gas flow in the exhaust gas passage.

10. The exhaust gas purifying system according to claim 1, wherein the additive agent injection valve is formed to have an axis direction of the additive agent injection valve tilted toward the downstream side of the exhaust gas flow when compared with the direction of the exhaust gas flow.

11. The exhaust gas purifying system according to claim 1, wherein the additive agent injection valve is formed to have an axis direction of the additive agent injection valve tilted toward the upstream side of the exhaust gas flow when compared with the direction of the exhaust gas flow.

12. The exhaust gas purifying system according to claim 1, wherein the additive agent is urea solution, and the catalyst accommodated in the catalyst unit is capable of promoting NOx (Nitride Oxide) reduction reaction which reduces NOx contained in the exhaust gas using ammonium generated by hydrolysis of the urea solution.

13. An exhaust gas purifying system comprising:

an additive agent injection valve, mounted on a passage wall of an exhaust gas passage through which exhaust gas as a target in purification passes, capable of injecting an additive agent into the exhaust gas passage; and a catalyst unit having catalyst, placed in a downstream side of the additive agent injection valve in the exhaust gas passage, capable of promoting an exhaust gas purifying reaction using at least the additive agent transported from the additive agent injection valve to the catalyst unit through the exhaust gas flow, wherein the additive agent injection valve comprises:

an outlet opening part through which the additive agent is injected into the exhaust gas passage;

a plurality of first injection holes and a plurality of second injection holes being formed in the outlet opening part, where the diameter of each second injection hole is greater than that of each first injection hole; and the second injection holes are placed at the upstream side of the exhaust gas flow in the exhaust gas passage when compared with the position of the first injection holes, and the first injection holes provide a first spray of the additive agent having a predetermined traveling distance, and the second injection holes provide a second spray of the additive agent having a traveling distance which is longer than the predetermined traveling distance of the first spray.

14. The exhaust gas purifying system according to claim 13, wherein a plate member is placed at the outlet opening part, and the first injection holes and the second injection holes are formed in the plate member.

15. The exhaust gas purifying system according to claim 13, wherein the additive agent is urea solution, and the catalyst accommodated in the catalyst unit is capable of promoting NOx (Nitride Oxide) reduction reaction which reduces NOx contained in the exhaust gas using ammonium generated by hydrolysis of the urea solution.

* * * * *